(12) United States Patent
Choi

(10) Patent No.: US 9,892,408 B2
(45) Date of Patent: Feb. 13, 2018

(54) TRANSACTION SYSTEM AND METHOD PERFORMED BY USING PERIPHERAL DEVICE

(71) Applicant: Samsung Electronics Co., Ltd., Suwon-si, Gyeonggi-do (KR)

(72) Inventor: Woo-jei Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/132,688

(22) Filed: Dec. 18, 2013

(65) Prior Publication Data

US 2014/0180923 A1 Jun. 26, 2014

(30) Foreign Application Priority Data

Dec. 21, 2012 (KR) .................. 10-2012-0151334
May 13, 2013 (KR) .................. 10-2013-0054007

(51) Int. Cl.
*G06Q 40/00* (2012.01)
*G06Q 20/40* (2012.01)
*G06Q 20/42* (2012.01)

(52) U.S. Cl.
CPC ............ *G06Q 20/40* (2013.01); *G06Q 20/42* (2013.01)

(58) Field of Classification Search
USPC ......................................... 705/44
See application file for complete search history.

(56) References Cited

U.S. PATENT DOCUMENTS

| | | | |
|---|---|---|---|
| 2005/0109838 A1 | 5/2005 | Linlor | |
| 2010/0273424 A1 | 10/2010 | De Petris et al. | |
| 2010/0304670 A1* | 12/2010 | Shuo | H04M 1/7253 455/41.1 |
| 2011/0238569 A1* | 9/2011 | Kim | G06Q 20/102 705/40 |
| 2011/0289004 A1* | 11/2011 | Prakash et al. | 705/71 |
| 2012/0030110 A1* | 2/2012 | Prakash et al. | 705/44 |
| 2012/0031969 A1 | 2/2012 | Hammad | |
| 2012/0052914 A1 | 3/2012 | Yaqub et al. | |
| 2012/0084210 A1 | 4/2012 | Farahmand | |
| 2012/0259780 A1* | 10/2012 | Kang | G06Q 20/3223 705/44 |
| 2012/0317628 A1 | 12/2012 | Yeager | |
| 2014/0092004 A1* | 4/2014 | Mishra et al. | 345/156 |
| 2016/0275475 A1 | 9/2016 | Lin et al. | |

FOREIGN PATENT DOCUMENTS

| | | |
|---|---|---|
| CN | 102254259 A | 11/2011 |
| CN | 102282578 A | 12/2011 |
| EP | 2 388 744 A2 | 11/2011 |
| JP | 2005-531203 A | 10/2005 |
| KR | 10-0836879 B1 | 6/2008 |
| KR | 10-2011-0128251 A | 11/2011 |
| WO | 2009/012047 A2 | 1/2009 |

\* cited by examiner

*Primary Examiner* — Hai Tran
(74) *Attorney, Agent, or Firm* — Jefferson IP Law, LLP

(57) ABSTRACT

A transaction system and method of performing a transaction by using a peripheral device are provided. The method includes receiving transaction information from an external device, searching for a peripheral device when the transaction information is received, and performing the transaction with a transaction server by using information received from the searched peripheral device and the transaction information.

20 Claims, 21 Drawing Sheets

| 60 | 62 | 64 |
|---|---|---|
| POSITION | AMOUNT | PERIPHERAL DEVICE |
| HOUSE | 0 ~ 100,000 WON | TV, WASHING MACHINE |
| COMPANY | 0 ~ 200,000 WON | PC |
| OUTSIDE | 0 ~ 300,000 WON | WRISTWATCH |
| OUTSIDE | 300,000 ~ 1,000,000 WON | MOBILE PHONE, WRISTWATCH |
| VEHICLE | 0 ~ 100,000 WON | HEAD UNIT OF VEHICLE |
| ⋮ | ⋮ | ⋮ |

TRANSACTION SYSTEM AND METHOD PERFORMED BY USING PERIPHERAL DEVICE

CROSS-REFERENCE TO RELATED APPLICATION(S)

This application claims the benefit under 35 U.S.C. § 119(a) of a Korean patent application, filed on Dec. 21, 2012 in the Korean Intellectual Property Office and assigned Serial No. 10-2012-0151334, and a Korean patent application, filed on May 13, 2013 in the Korean Intellectual Property Office and assigned Serial No. 10-2013-0054007, the entire disclosure of each of which is hereby incorporated by reference.

TECHNICAL FIELD

The present disclosure relates to a transaction system and method of performing a transaction by using a peripheral device. More particularly, the present disclosure relates to a transaction system and method of performing a transaction using information received from a searched peripheral device and transaction information.

BACKGROUND

As functions of devices improve, and communication technology develops, devices are enabled to perform various functions via a network. In particular, in order to purchase a product, a user may perform a transaction with various transaction methods by using various devices via the network.

However, when a user cannot immediately perform a transaction, or a user under age has to perform a transaction after receiving approval from parents, the user may not perform the transaction by using the user's device. Also, when an employee performs a transaction using the employee's device to purchase a product at the expense of a company, the company has to separately manage the expense due to the purchase of the product.

Accordingly, there is a need for a user who has a difficulty in performing a transaction needs to safely perform a transaction by using transaction resources of another user, without using a device of the user. Also, there is a demand for a technology for allowing a transaction to be safely performed although a device for requesting a transaction or another device for performing a transaction has been stolen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure includes a transaction system and method of performing a transaction by using a peripheral device near a device.

Another aspect of the present disclosure includes a transaction system and method of performing a transaction, the method performed by a device in response to a request from an external device.

Another aspect of the present disclosure includes a transaction system and method of performing a transaction when a specified peripheral device is searched for.

Another aspect of the present disclosure includes a transaction system and method of performing a transaction, the method performed by a device using all or some of a plurality of pieces of authentication information received from specified peripheral devices.

Additional aspects will be set forth in part in the description which follows and, in part, will be apparent from the description, or may be learned by practice of the presented embodiments.

In accordance with a first aspect of the present disclosure, a method of performing a transaction is provided. The method includes receiving transaction information from an external device, searching for a peripheral device when the transaction information is received, and performing the transaction with a transaction server by using information received from the searched peripheral device and the transaction information.

The information received from the searched peripheral device may include an IDentification (ID) value of the searched peripheral device, and the performing of the transaction may include performing the transaction after determining that the searched peripheral device is a specified peripheral device.

The specified peripheral device may be set according to a position of the device.

The specified peripheral device may be set according to an amount of transactions requested by the external device.

The information received from the searched peripheral device may include authentication information stored in the searched peripheral device, and the performing of the transaction may include performing the transaction by using authentication information received from the searched peripheral device.

The performing of the transaction may include performing the transaction when the authentication information is received from a specified peripheral device.

The searching may include searching for a plurality of peripheral devices, and the performing of the transaction may include combining pieces of one authentication information received from the plurality of peripheral devices, and performing the transaction by using the combined one authentication information.

The searching may include searching for a plurality of peripheral devices, a plurality of pieces of different authentication information may be stored in the plurality of peripheral devices, respectively, and the performing of the transaction may include performing the transaction by using at least one of the plurality of pieces of different authentication information that are received from the plurality of peripheral devices, respectively.

The searching may include searching for a plurality of peripheral devices, a plurality of pieces of same authentication information may be stored in the plurality of peripheral devices, respectively, and the performing of the transaction may include performing the transaction by using at least one of the plurality of pieces of same authentication information that are received from the plurality of peripheral devices, respectively.

The method may further include requesting the external device for a video call when the transaction information is received, receiving an image of a user of the external device from the external device via the video call, wherein the image was captured by the external device, and determining whether to perform the transaction based on the image.

The method may further include receiving a transaction request message from the external device, and displaying the transaction request message on a screen of the device.

The transaction information may include at least one of product information, transaction amount information, and a transaction request message that are related to a product that a user of the external device attempts to purchase.

The product information may be provided to the external device from a website that the external device accesses to purchase the product.

The product information may be obtained by the external device based on an image of a barcode of the product, wherein the image was captured by the external device.

In accordance with a second aspect of the present disclosure, a method of performing a transaction via an external device is provided. The method includes searching for the external device in which a specified transaction application is installed, requesting the external device for the transaction, and receiving transaction completion information that is generated when the external device performs the transaction, wherein the requesting includes providing transaction information to the external device, and the transaction information and information that is received by the external device from a peripheral device near the external device are used by the external device to perform the transaction.

In accordance with a third aspect of the present disclosure, a method of performing a transaction is provided. The method includes obtaining transaction information for the transaction, searching for at least one peripheral device near the device, and performing the transaction with a transaction server by using information received from the at least one peripheral device and the transaction information.

In accordance with a fourth aspect of the present disclosure, a device is provided. The device includes a memory configured to store at least one program, and a processor configured to perform a transaction on behalf of an external device by executing the at least one program, wherein the at least one program includes commands for receiving transaction information from the external device, searching for a peripheral device, based on the transaction information, and performing the transaction with a transaction server using information received from the searched peripheral device and the transaction information.

The information received from the searched peripheral device may include an IDentification (ID) value of the searched peripheral device, and the performing of the transaction may include performing the transaction after determining that the searched peripheral device is a specified peripheral device.

The specified peripheral device may be set according to a position of the device.

The specified peripheral device may be set according to an amount of transactions requested by the external device.

The information received from the searched peripheral device may include authentication information stored in the searched peripheral device, and the performing of the transaction may include performing the transaction by using the authentication information received from the searched peripheral device.

The performing of the transaction may include performing the transaction when the authentication information is received from a specified peripheral device.

The searching may include searching for a plurality of peripheral devices, and the performing of the transaction may include combining pieces of one authentication information received from the plurality of peripheral devices, and performing the transaction by using the combined one authentication information.

The searching may include searching for a plurality of peripheral devices, a plurality of pieces of different authentication information may be stored in the plurality of peripheral devices, respectively, and the performing of the transaction may include performing the transaction by using at least one of the plurality of pieces of different authentication information that are received from the plurality of peripheral devices, respectively.

The searching may include searching for a plurality of peripheral devices, a plurality of pieces of same authentication information are stored in the plurality of peripheral devices, respectively, and the performing of the transaction may include performing the transaction by using at least one of the plurality of pieces of same authentication information that are received from the plurality of peripheral devices, respectively.

The at least one program may further include commands for requesting the external device for a video call when the transaction information is received, receiving an image of a user of the external device from the external device via the video call, wherein the image was captured by the external device, and determining whether to perform the transaction based on the image.

The at least one program may further include commands for receiving a transaction request message from the external device, and displaying the transaction request message on a screen of the device.

The transaction information may include at least one of product information, transaction amount information, and a transaction request message that are related to a product that a user of the external device attempts to purchase.

The product information may be provided to the external device from a website that the external device accesses to purchase the product.

The product information may be obtained by the external device based on an image of a barcode of the product, wherein the image was captured by the external device.

In accordance with a fifth aspect of the present disclosure, a non-transitory computer-readable recording medium having recorded thereon a program which, when executed by a computer, performs the method of the first aspect of the present disclosure is provided.

In accordance with a sixth aspect of the present disclosure, a non-transitory computer-readable recording medium having recorded thereon a program which, when executed by a computer, performs the method of the second aspect of the present disclosure is provided.

In accordance with a seventh aspect of the present disclosure, a non-transitory computer-readable recording medium having recorded thereon a program which, when executed by a computer, performs the method of the third aspect of the present disclosure is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "at least one of," when preceding a list of elements, modify the entire list of elements and do not modify the individual elements of the list.

Figure 1:
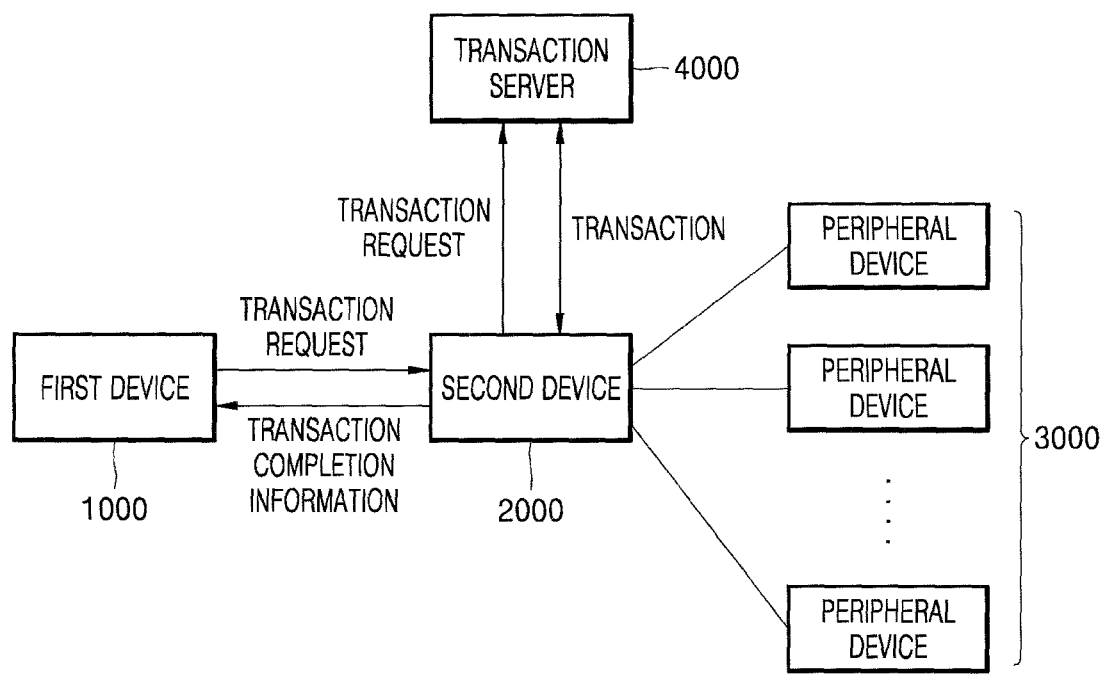
FIG. 1 illustrates a transaction system for allowing a first device to perform a transaction via a second device according to an embodiment of the present disclosure.

FIG. 1 illustrates a transaction system for allowing a first device to perform a transaction via a second device according to an embodiment of the present disclosure.

Referring to FIG. 1, the transaction system includes a first device 1000, a second device 2000, one or more peripheral devices 3000, and a transaction server 4000. In response to a transaction request from the first device 1000, the second device 2000 may perform a transaction with the transaction server 4000 when the one or more peripheral devices 3000 are searched for.

The first device 1000 requests the second device 2000 for a transaction. When a user of the first device 1000 purchases a product online or offline, the user may request a user of the second device 2000 for the transaction by using the first device 1000. The first device 1000 may generate transaction information about product information, a transaction amount, or the like, and may provide the transaction information to the second device 2000. Also, the first device 1000 may generate a transaction request message based on a user input, and may transmit the transaction request message to the second device 2000.

The second device 2000 performs the transaction with the transaction server 4000, in response to the transaction request from the first device 1000. Also, the second device 2000 may verify the user of the first device 1000 via a video call, and may approve the transaction request from the first device 1000. The second device 2000 may search for the one or more peripheral devices 3000 near the second device 2000, and when the specified peripheral device 3000 is searched for, the second device 2000 may perform the transaction with the transaction server 4000.

When the second device 2000 and the transaction server 4000 complete the transaction, transaction completion information may be generated and may be provided from the server 4000 to the first device 1000.

The first device 1000 may complete the purchase of the product by using the transaction completion information.

Each of the first device 1000, the second device 2000, and the peripheral device 3000 may be, but is not limited to, a smart phone, a mobile phone, a Personal Digital Assistant (PDA), a laptop, a media player, a Global Positioning System (GPS) apparatus, or other mobile or non-mobile apparatuses. In particular, the peripheral device 3000 includes all types of a device that may be connected to the second device 2000 and may provide authentication information to the second device 2000, and examples of the peripheral device 3000 may include a printer, a watch, a pen, an electronic blackboard, a touch table, or the like.

Figure 2:
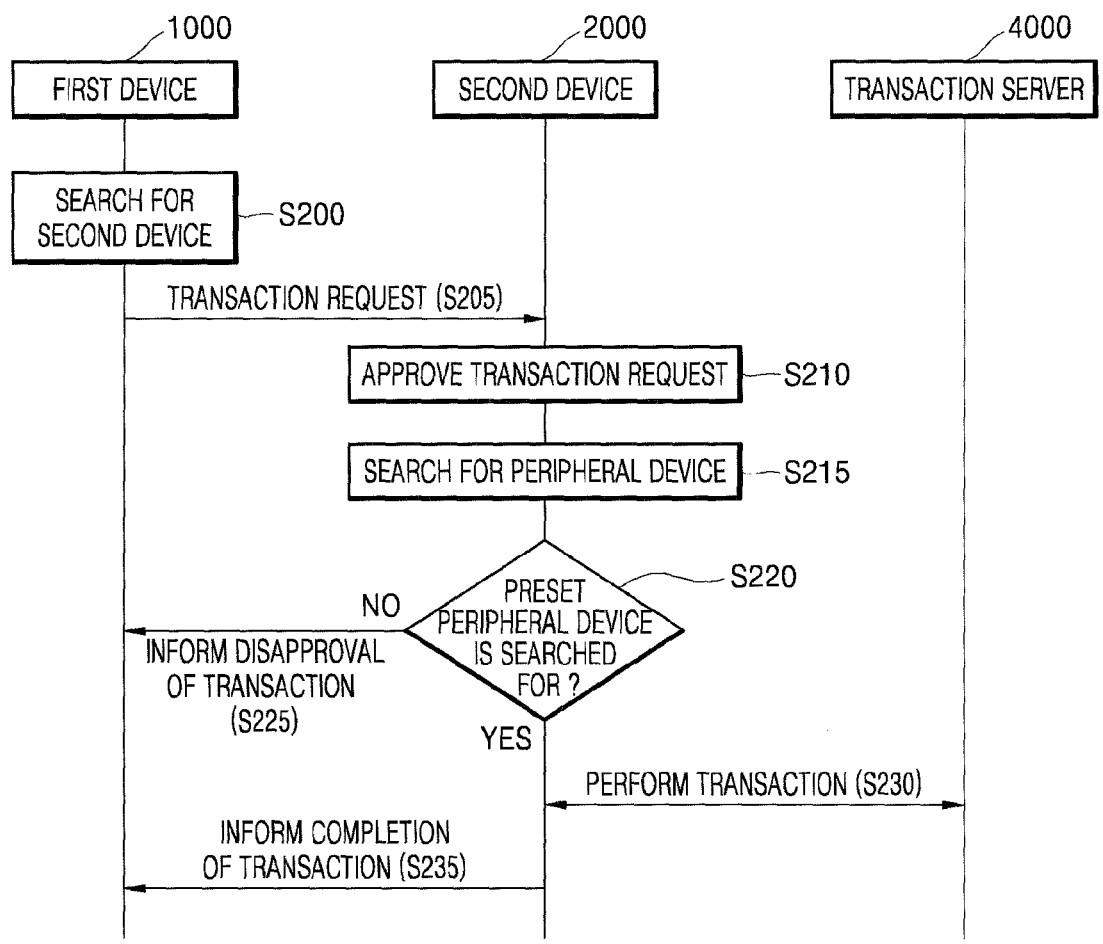
FIG. 2 is a flowchart of a method of performing a transaction via a second device, the method performed by a first device according to an embodiment of the present disclosure.

FIG. 2 is a flowchart of a method of performing a transaction via a second device, the method performed by a first device according to an embodiment of the present disclosure.

Referring to FIG. 2, in operation S200, the first device 1000 searches for the second device 2000. The first device 1000 may search for the second device 2000 in which a transaction application for providing the transaction method is installed. The first device 1000 may send a query to the second device 2000 so as to ask whether the transaction application for providing the transaction method is installed in the second device 2000, and when the transaction application is installed in the second device 2000, the first device 1000 may select the second device 2000 as a transaction device.

In operation S205, the first device 1000 transmits a transaction request to the second device 2000. The first device 1000 may transmit transaction information and a transaction request message to the second device 2000. The transaction information may be related to a product and a transaction for the product and may include a plurality of pieces of information about a name of the product, a price of the product, a transaction amount, a model name of the product, a manufacturer, a seller of the product, and a transaction location. Also, the transaction request message may be generated by a user of the first device 1000 so as to request a user of the second device 2000 for the transaction.

In operation S210, the second device 2000 approves the transaction request from the first device 1000. The second device 2000 may receive the transaction request from the first device 1000 and may determine whether to approve the transaction request.

For example, in response to the transaction request from the first device 1000, the second device 2000 may request the first device 1000 for connection of a video call. Also, the user of the second device 2000 may verify the user of the first device 1000 via the video call and may determine to perform the transaction on behalf of the user of the first device 1000.

In operation S215, the second device 2000 searches for the peripheral device 3000. The second device 2000 searches for the peripheral device 3000 near the second device 2000 and obtains peripheral device information about the searched peripheral device 3000. The peripheral device information may include, but is not limited to, a plurality of pieces of information about an IDentification (ID) value (e.g., a Service Set IDentifier (SSID), a model name, a model number, etc.) of the peripheral device 3000, a type of the peripheral device 3000, and information about a function of the peripheral device 3000.

The second device 2000 may receive the ID value of the peripheral device 3000 from the peripheral device 3000, and may obtain the peripheral device information from a server (not shown) based on the ID value of the peripheral device 3000, but various embodiments of the present disclosure are not limited thereto.

The second device 2000 may search for the peripheral device 3000 by using Near Field Communication (NFC), ZigBee communication, Radio Frequency IDentification (RFID) communication, Ultra Wide Band (UWB) communication, or Bluetooth communication, but various embodiments of the present disclosure are not limited thereto.

In operation S220, the second device 2000 determines whether the specified peripheral device 3000 is searched for. The peripheral device 3000 may be previously matched with at least one of a position of the second device 2000 and a transaction amount. In this regard, the second device 2000 may determine whether the specified peripheral device 3000 is searched for, based on the position of the second device 2000 and the transaction amount related to the transaction requested by the first device 1000.

For example, when the second device 2000 is positioned outside, if the transaction amount is within a certain monetary range, the second device 2000 may determine whether a mobile phone and a wristwatch of the user of the second device 2000 are searched for.

A table for displaying types of the peripheral devices 3000 which are matched with positions of the second device 2000 and transaction amounts will be described in detail with reference to FIG. 6.

In operation S220, when the second device 2000 determines that the specified peripheral device 3000 is not searched for, in operation S225, the second device 2000 informs the first device 1000 that the transaction is not approved. When the second device 2000 cannot search for the specified peripheral device 3000, the second device 2000 may not perform the transaction requested by the first device 1000. Also, the second device 2000 may inform the first device 1000 that the transaction has not been performed.

In operation S220, when the second device 2000 determines that the specified peripheral device 3000 is searched for, in operation S230, the second device 2000 performs the transaction with the transaction server 4000. The second device 2000 may select a transaction method and may request the transaction server 4000 for the transaction by using the selected transaction method. Also, in response to a transaction request from the second device 2000, the transaction server 4000 may perform the transaction by using the transaction method selected by the second device 2000.

In operation S235, the second device 2000 informs the first device 1000 that the transaction has been completed. When the transaction is completed in operation S230, the second device 2000 may receive transaction completion information from the transaction server 4000, and may transmit the transaction completion information to the first device 1000.

Figure 3:
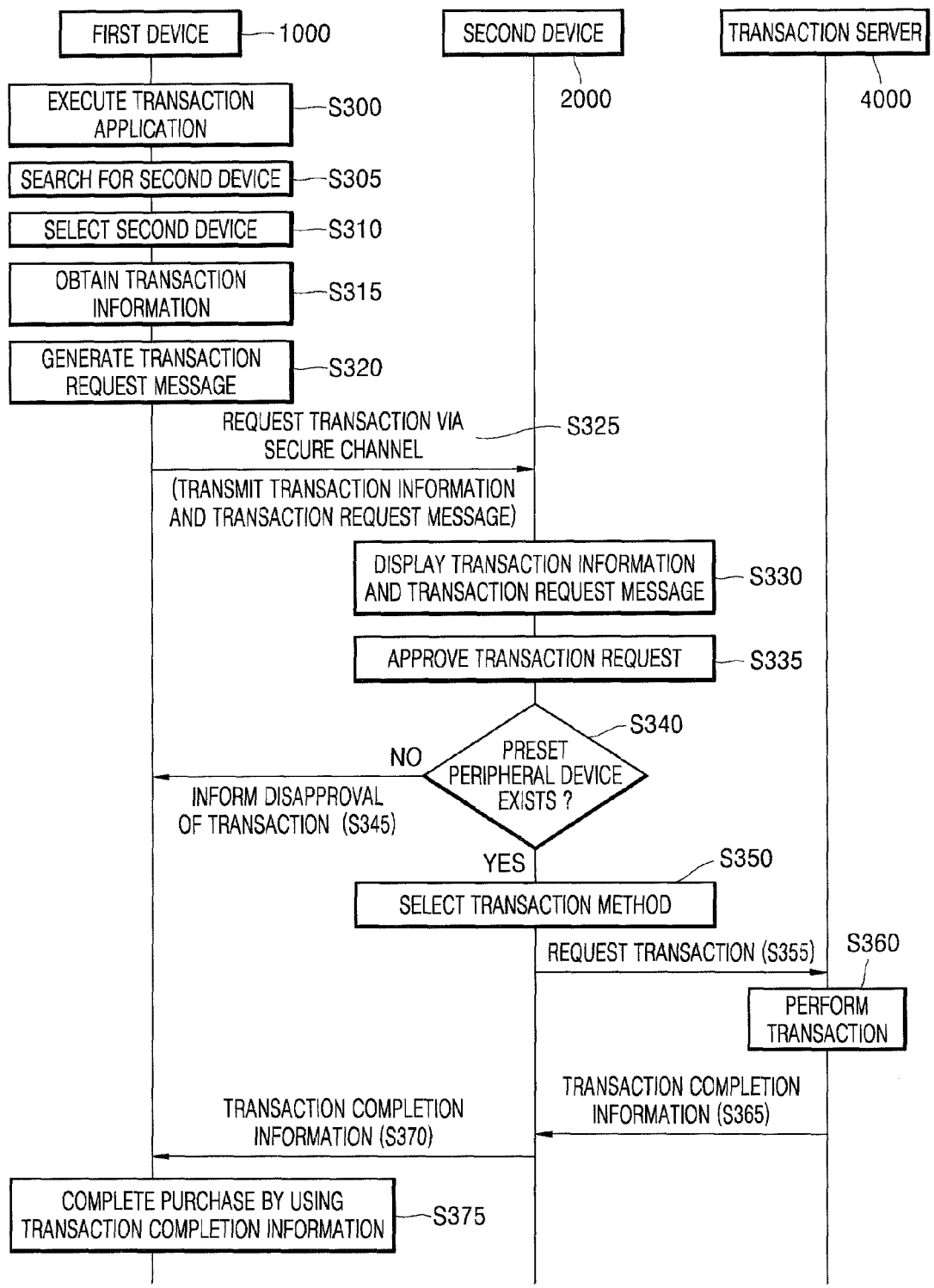
FIG. 3 is a flowchart of a method of performing a transaction via a second device, the method performed by a first device according to an embodiment of the present disclosure.

FIG. 3 is a flowchart of a method of performing a transaction via a second device, the method performed by a first device according to an embodiment of the present disclosure.

Referring to FIG. 3, in operation S300, the first device 1000 executes a transaction application. The transaction application may search for the second device 2000 and may request the second device 2000 for a transaction. For example, the transaction application may be included in an application that provides a function of a mobile wallet, but various embodiments of the present disclosure are not limited thereto.

In operation S305, the first device 1000 searches for the second device 2000. The first device 1000 may search for the second device 2000 on which an application related to the executed transaction application is installed. The application related to the executed transaction application may be enabled to perform a transaction, and may be an application equivalent to the executed transaction application, or may be an application that is connected with the executed transaction application and performs a transaction on behalf of the first device 1000, but various embodiments of the present disclosure are not limited thereto.

In operation S310, the first device 1000 selects the second device 2000 as a transaction device. When a plurality of the second devices 2000 are searched for, the first device 1000 may select at least one of the plurality of the second devices 2000.

In operation S315, the first device 1000 obtains transaction information related to the transaction. The transaction information may include product information. When a user of the first device 1000 attempts to purchase a product online, the first device 1000 may obtain the product information related to a transaction for the product from a website that sells the product. For example, the first device 1000 may extract information about a name of the product, a manufacturer, and an amount of the product from a shopping mall website, but various embodiments of the present disclosure are not limited thereto.

When the user of the first device 1000 attempts to purchase a product offline, the first device 1000 may obtain product information from a mark on the product. The mark is a representation of particular information to be easily read, for example, the mark may include a one-dimensional barcode, a second-dimensional barcode, a third-dimensional barcode, a color barcode, or a specified pattern. The first device 1000 may capture an image of the mark on the product and may transmit the captured image of the mark to a product information providing server (not shown). Also, the product information providing server may obtain the product information about the product based on the image of the mark, and may provide the product information to the first device 1000. Also, the first device 1000 may obtain a plurality of information about a transaction location, a seller of the product, and a transaction amount.

In operation S320, the first device 1000 generates a transaction request message. The first device 1000 may display an input window for an input of the transaction request message on a screen of the first device 1000, and may generate the transaction request message based on a user input via the input window. For example, the user of the first device 1000 may enter a transaction request message "Please, pay my academy expenses" into the input window.

In operation S325, the first device 1000 requests the second device 2000 for a transaction via a secure channel. The first device 1000 may establish the secure channel for a transaction request and may transmit the transaction request to the second device 2000 via the secure channel. The first device 1000 may establish the secure channel based on a Certification Authority (CA) certificate, but various embodiments of the present disclosure are not limited thereto. The secure channel may be established according to Transport Layer Security (TLS) and Datagram Transport Layer Security (DTLS) standards, but various embodiments of the present disclosure are not limited thereto.

The first device 1000 may request the second device 2000 for the transaction while the first device 1000 provides transaction information and the transaction request message related to the transaction to the second device 2000. The transaction information may be information related to the product and the transaction for the product and may include, but is not limited to, information about a name of the product, a price of the product, a transaction amount, a model name of the product, a manufacturer, a seller of the product, and a transaction location.

In operation S330, the second device 2000 displays the transaction information and the transaction request message received from the first device 1000.

In operation S335, the second device 2000 approves the transaction request from the first device 1000. The second device 2000 may approve the transaction request from the first device 1000 based on the displayed transaction information and transaction request message. Also, the second device 2000 may request the first device 1000 for a video call. The user of the second device 2000 may verify the user of the first device 1000 based on the video call between the first device 1000 and the second device 2000.

In operation S340, the second device 2000 determines whether the specified peripheral device 3000 is searched for. The second device 2000 may search for the peripheral device 3000 by using NFC, ZigBee communication, RFID communication, UWB communication, or Bluetooth communication, but various embodiments of the present disclosure are not limited thereto.

The second device 2000 may determine the transaction amount from the transaction information received from the first device 1000, and may determine a position of the second device 2000. The second device 2000 may determine its position by using a GPS sensor, but various embodiments of the present disclosure are not limited thereto, thus, the second device 2000 may determine its position by using one of various position information obtaining methods.

The second device 2000 may determine whether the peripheral device 3000 that is matched with the transaction amount and the position of the second device 2000 is searched for. For this, types of the peripheral device 3000 which are matched with transaction amounts and positions of the second device 2000 may be previously stored in a memory of the second device 2000.

In operation S340, when the second device 2000 determines that the specified peripheral device 3000 is not searched for, in operation S345, the second device 2000 informs the first device 1000 that the transaction is not approved.

In operation S340, when the second device 2000 determines that the specified peripheral device 3000 is searched for, in operation S350, the second device 2000 selects a transaction method. The second device 2000 may display a list of transaction methods on a screen of the second device 2000, and may select the transaction method based on a user input.

In operation S355, the second device 2000 requests the transaction server 4000 for the transaction. The second device 2000 may provide the selected transaction method and the transaction information received from the first device 1000 to the transaction server 4000 and may request the transaction server 4000 for the transaction. The second device 2000 may provide authentication information for the transaction to the transaction server 4000.

In operation S360, the transaction server 4000 performs the transaction, and in operation S365, the transaction server 4000 provides transaction completion information to the second device 2000. The transaction completion information indicates completion of the transaction and may include a predetermined ID value to distinguish between the completed transaction and another transaction.

In operation S370, the second device 2000 provides to the first device 1000 the transaction completion information that is received from the transaction server 4000.

In operation S375, the first device 1000 completes the purchase of the product by using the transaction completion information. For example, the first device 1000 may complete the purchase of the product by providing the transaction completion information to a website that sells the product or by providing the transaction completion information to a Point of Sale (POS) terminal in a shop, but various embodiments of the present disclosure are not limited thereto. The transaction completion information may be provided from the transaction server 4000 to the website or the POS terminal in the shop.

Figure 4:
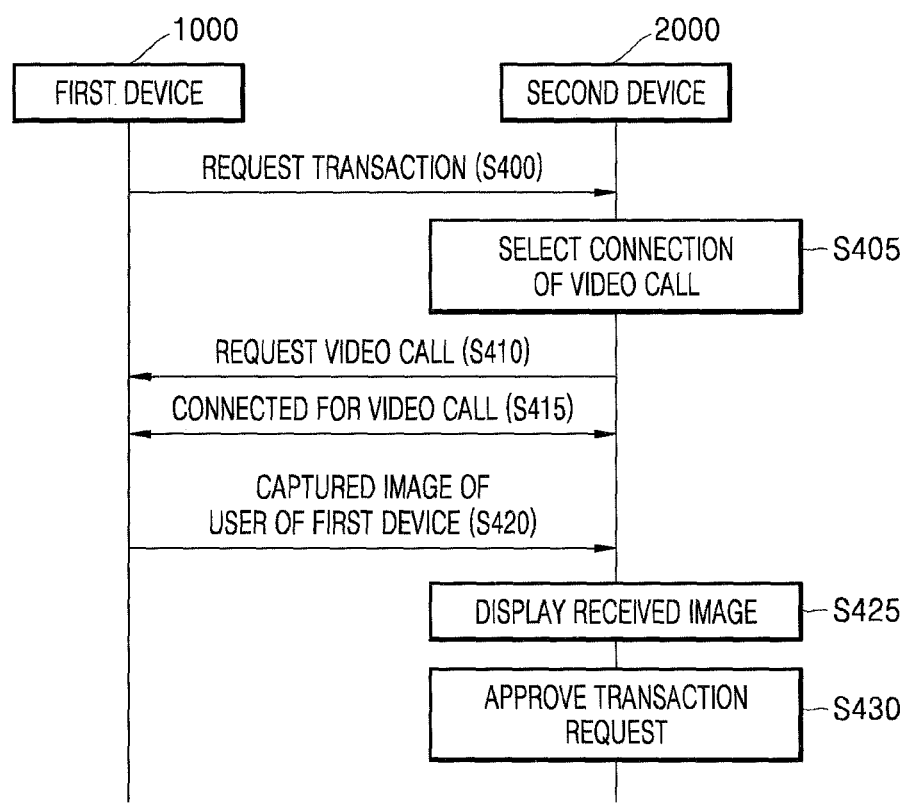
FIG. 4 is a flowchart of a method of approving a transaction request from a first device, the method performed by a second device according to an embodiment of the present disclosure.

FIG. 4 is a flowchart of a method of approving a transaction request from a first device, the method performed by a second device according to an embodiment of the present disclosure.

Referring to FIG. 4, in operation S400, the first device 1000 requests the second device 2000 for a transaction. The first device 1000 may transmit transaction information and a transaction request message to the second device 2000. The transaction information may be information related to a product and the transaction for the product and may include, but is not limited to, information about a name of the product, a price of the product, a transaction amount, a model name of the product, a manufacturer, a seller of the product, and a transaction location. Also, the transaction request message may be generated by a user of the first device 1000 so as to request a user of the second device 2000 for the transaction.

In operation S405, the second device 2000 selects connection of a video call. A window to inform reception of a transaction request may be displayed on a screen of the second device 2000 that has received the transaction request, and the displayed window may include a User Interface (UI) for connecting the video call with the first device 1000. Also, the user of the second device 2000 may select a button in the UI so as to perform connection of the video call.

In operation S410, the second device 2000 requests the first device 1000 for the video call. The second device 2000 may request a server (not shown) of a communication service provider that provides a video call service for the video call with the first device 1000, but various embodiments of the present disclosure are not limited thereto. The second device 2000 may directly request the first device 1000 for the video call.

In operation S415, the first device 1000 and the second device 2000 are connected for the video call, and in operation S420, the first device 1000 provides a captured image of the user of the first device 1000 to the second device 2000.

In operation S425, the second device 2000 displays the captured image. The second device 2000 may display the captured image that is received from the first device 1000 in the window displayed in operation S405, but various embodiments of the present disclosure are not limited thereto. The second device 2000 may display a separate window for the video call and may display the captured image from the first display 1000 on the separate window.

In operation S430, the second device 2000 approves the transaction request from the first device 1000. The user of the second device 2000 may verify the user of the first device 1000 via the video call with the user of the first device 1000. The user of the second device 2000 may perform an input of approving the transaction request from the first device 1000 on the second device 2000, so that the second device 2000 may approve the transaction request from the first device 1000.

Figure 5:
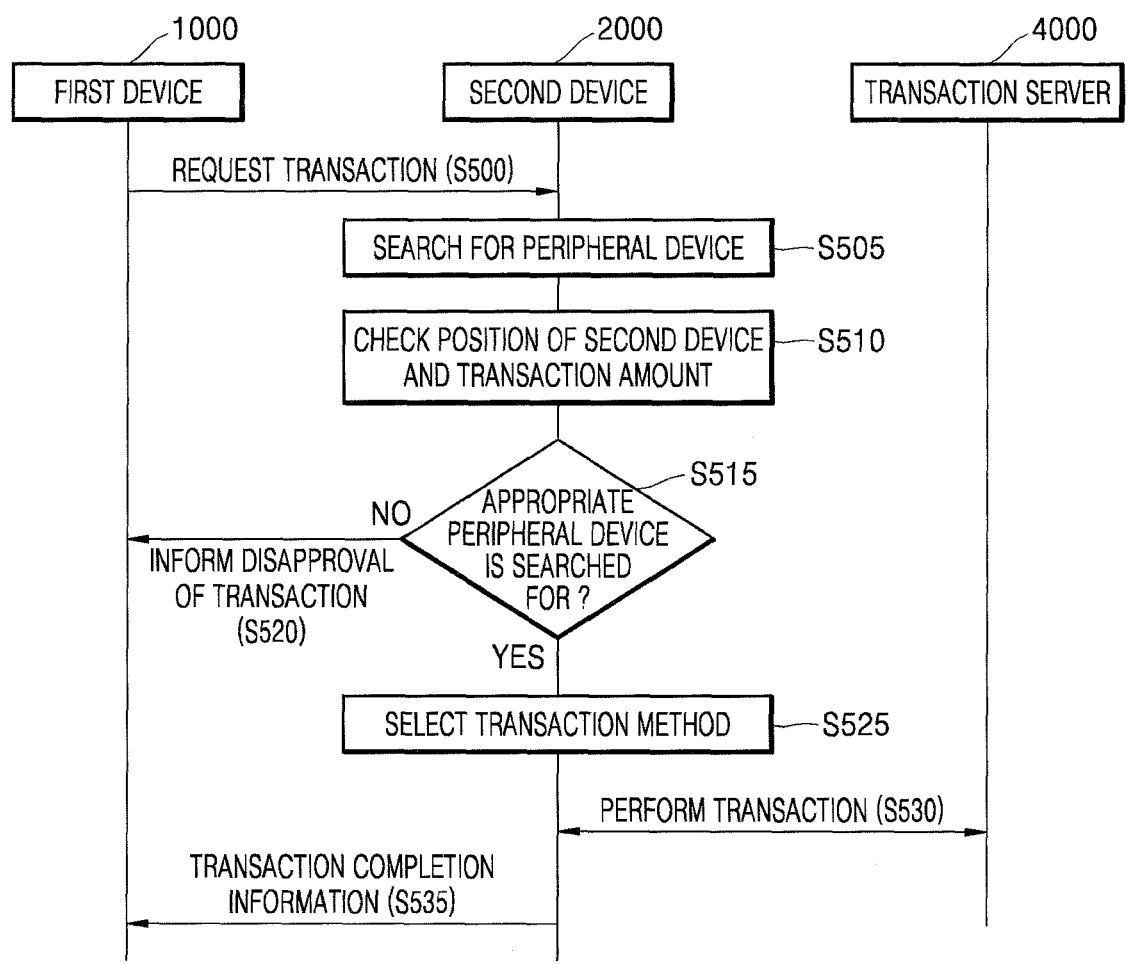
FIG. 5 is a flowchart of a method of performing a transaction based on a searched peripheral device, the method performed by a second device according to an embodiment of the present disclosure.

FIG. 5 is a flowchart of a method of performing a transaction based on a searched peripheral device, the method performed by a second device, according to an embodiment of the present disclosure.

Referring to FIG. 5, in operation S500, the first device 1000 requests the second device 2000 for a transaction. The first device 1000 may transmit transaction information and a transaction request message to the second device 2000. The transaction information may be information related to a product and the transaction for the product and may include, but is not limited to, a plurality of pieces of information about a name of the product, a price of the product, a transaction amount, a model name of the product, a manufacturer, a seller of the product, and a transaction location. Also, the transaction request message may be generated by a user of the first device 1000 so as to request a user of the second device 2000 for the transaction.

In operation S505, the second device 2000 searches for the peripheral device 3000. The second device 2000 searches for the peripheral device 3000 near the second device 2000 and obtains peripheral device information about the searched peripheral device 3000. The peripheral device information may include, but is not limited to, a plurality of pieces of information about an ID value (e.g., an SSID, a model name, a model number, etc.) of the peripheral device 3000, a type of the peripheral device 3000, and information about a function of the peripheral device 3000.

The second device 2000 may receive the ID value of the peripheral device 3000 from the peripheral device 3000 and may obtain the peripheral device information from a server (not shown) based on the received ID value of the peripheral device 3000, but various embodiments of the present disclosure are not limited thereto.

Also, the second device 2000 may search for the peripheral device 3000 by using NFC, ZigBee communication, RFID communication, UWB communication, or Bluetooth communication, but various embodiments of the present disclosure are not limited thereto.

In operation S510, the second device 2000 determines a position of the second device 2000 and a transaction amount. The second device 2000 may determine the transaction amount from transaction information that is transmitted by the first device 1000. Also, the second device 2000 may determine the position of the second device 2000 by using a GPS sensor or AP information, but various embodiments of the present disclosure are not limited thereto. The second device 2000 may determine the position of the second device 2000 by using one of various position information obtaining methods.

In operation S515, the second device 2000 determines whether the appropriate peripheral device 3000 is searched for. Types of the peripheral device 3000 which are matched with transaction amounts and positions of the second device 2000 may be previously stored in a memory of the second device 2000, and the second device 2000 may determine whether the peripheral device 3000 that is matched with the transaction amount and the position of the second device 2000 is searched for. For example, when the second device 2000 is positioned outside, if the transaction amount is within a certain range, the second device 2000 may determine whether a mobile phone and a wristwatch of the user of the second device 2000 are searched for.

As a result of the determination (in operation S515), when the appropriate peripheral device 3000 is not searched for, in operation S520, the second device 2000 informs the first device 1000 that the transaction is not approved.

As a result of the determination (in operation S515), when the appropriate peripheral device 3000 is searched for, in operation S525, the second device 2000 selects a transaction method. For example, the second device 2000 may select at least one of a transaction performed by using a credit card and a transaction performed by using the mobile phone, but various embodiments of the present disclosure are not limited thereto. Also, after the second device 2000 selects to perform the transaction by using the credit card, the second device 2000 may select a type of the credit card.

In operation S530, the second device 2000 performs the transaction with the transaction server 4000. The second device 2000 may provide the selected transaction method and the transaction information from the first device 1000 to the transaction server 4000 and may request the transaction server 4000 for the transaction. Also, the second device 2000 may provide information about the credit card or the mobile phone that is to be used in the transaction to the transaction server 4000. The second device 2000 may provide authentication information for the transaction to the transaction server 4000.

The transaction server 4000 may perform the transaction and may provide transaction completion information to the second device 2000. The transaction completion information indicates completion of the transaction and may include an ID value to distinguish between the completed transaction and another transaction.

In operation S535, the second device 2000 provides the transaction completion information to the first device 1000. Also, the first device 1000 may complete the purchase of the product by using the transaction completion information.

Figures 6, 7:
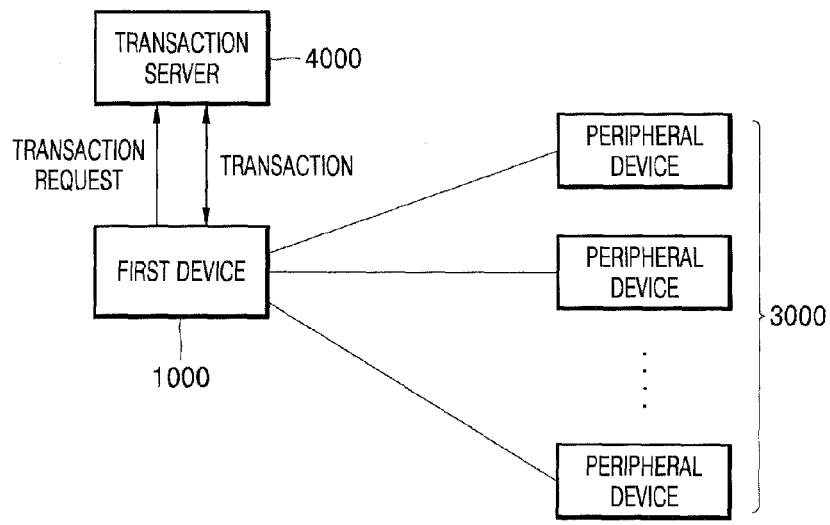
FIG. 6 illustrates a peripheral device list table that shows peripheral devices that are matched with positions of a second device and transaction amounts according to an embodiment of the present disclosure.
FIG. 7 illustrates a transaction system that allows a first device to perform a transaction by using a searched peripheral device according to an embodiment of the present disclosure.

FIG. 6 illustrates a peripheral device list table that shows peripheral devices that are matched with positions of a second device and transaction amounts according to an embodiment of the present disclosure.

Referring to FIG. 6, the peripheral device list table includes a position field 60, an amount field 62, and a peripheral device field 64.

The position field 60 may include position values of the second device 2000. For example, "house", "company", "outside", and "vehicle" may be recorded to the position field 60.

The amount field 62 may include transaction amounts. For example, ranges of an amount, e.g., "0-300,000 won" and "300,000-1,000,000 won", may be recorded to the amount field 62. In this example, "won" refers to South Korean currency, but embodiments of the present disclosure and not limited thereto.

The peripheral device field 64 may include ID values of the peripheral devices that are matched with the positions of the second device 2000 and the transaction amounts. For example, the ID values of the peripheral devices, e.g., "TV", "washing machine", "PC", "wristwatch", and "head unit of vehicle", may be recorded to the peripheral device field 64. However, various embodiments of the present disclosure are not limited thereto, thus, various ID values capable of distinguishing between the peripheral devices, e.g., model names of the peripheral devices, IDs of users of the peripheral devices, or the like, may be recorded to the peripheral device field 64.

Therefore, the second device 2000 may determine whether the peripheral device 3000 that is matched with a current position of the second device 2000 and a transaction amount is searched for, by using a table such as the peripheral device list table shown in FIG. 6.

FIG. 7 illustrates a transaction system that allows a first device to perform a transaction by using a searched peripheral device according to an embodiment of the present disclosure.

Referring to FIG. 7, the first device 1000 may not request the second device 2000 for a transaction of a product but may directly request the transaction server 4000 for the transaction of the product. In this case, the first device 1000 may determine whether the peripheral device 3000 that is matched with at least one of a current position of the first device 1000 and a transaction amount is searched for, and if the specified peripheral device 3000 is searched for, the first device 1000 may perform the transaction with the transaction server 4000.

Figure 8:
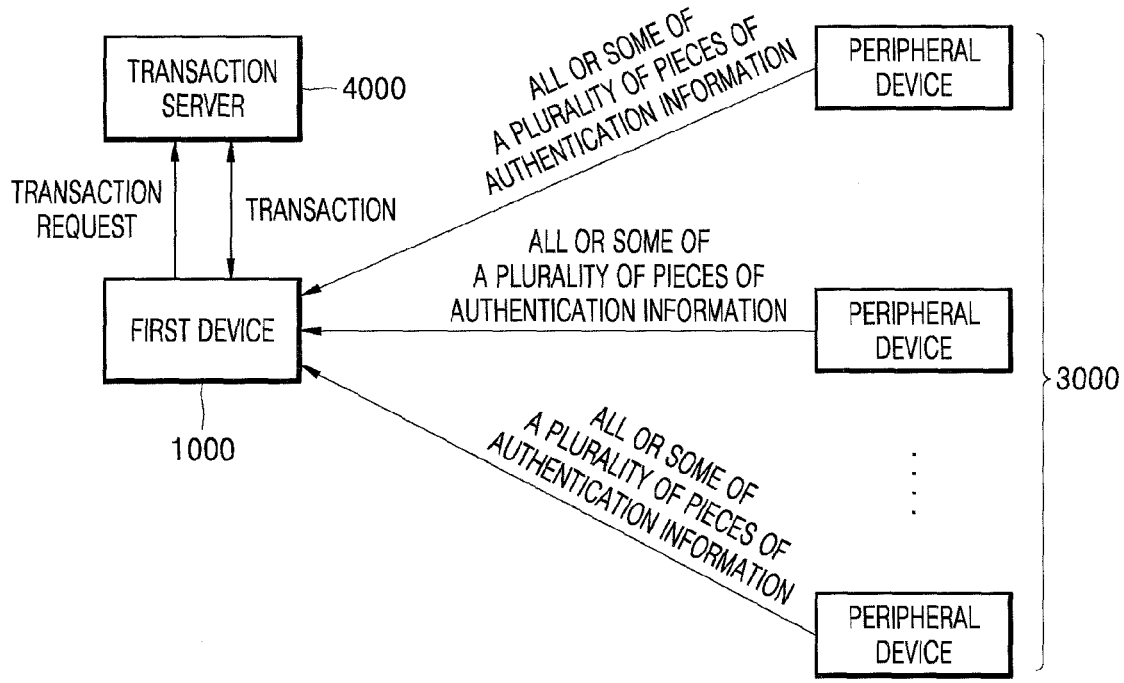
FIG. 8 illustrates a transaction system that allows a first device to perform a transaction by using authentication information transmitted by a peripheral device according to an embodiment of the present disclosure.

FIG. 8 illustrates a transaction system that allows a first device to perform a transaction by using authentication information transmitted by a peripheral device according to an embodiment of the present disclosure.

Referring to FIG. 8, the first device 1000 may not request the second device 2000 for a transaction of a product but may directly request the transaction server 4000 for the transaction of the product. In this case, the first device 1000 may receive all or some of authentication information from peripheral devices 3000 near the first device 1000, and may perform the transaction with the transaction server 4000 by using all or some of the authentication information.

The transaction of FIG. 8 which is performed by the first device 1000 using all or some of the plurality of pieces of authentication information transmitted by the peripheral devices 3000 will be described with reference to FIGS. 9 through 11.

Figure 9:
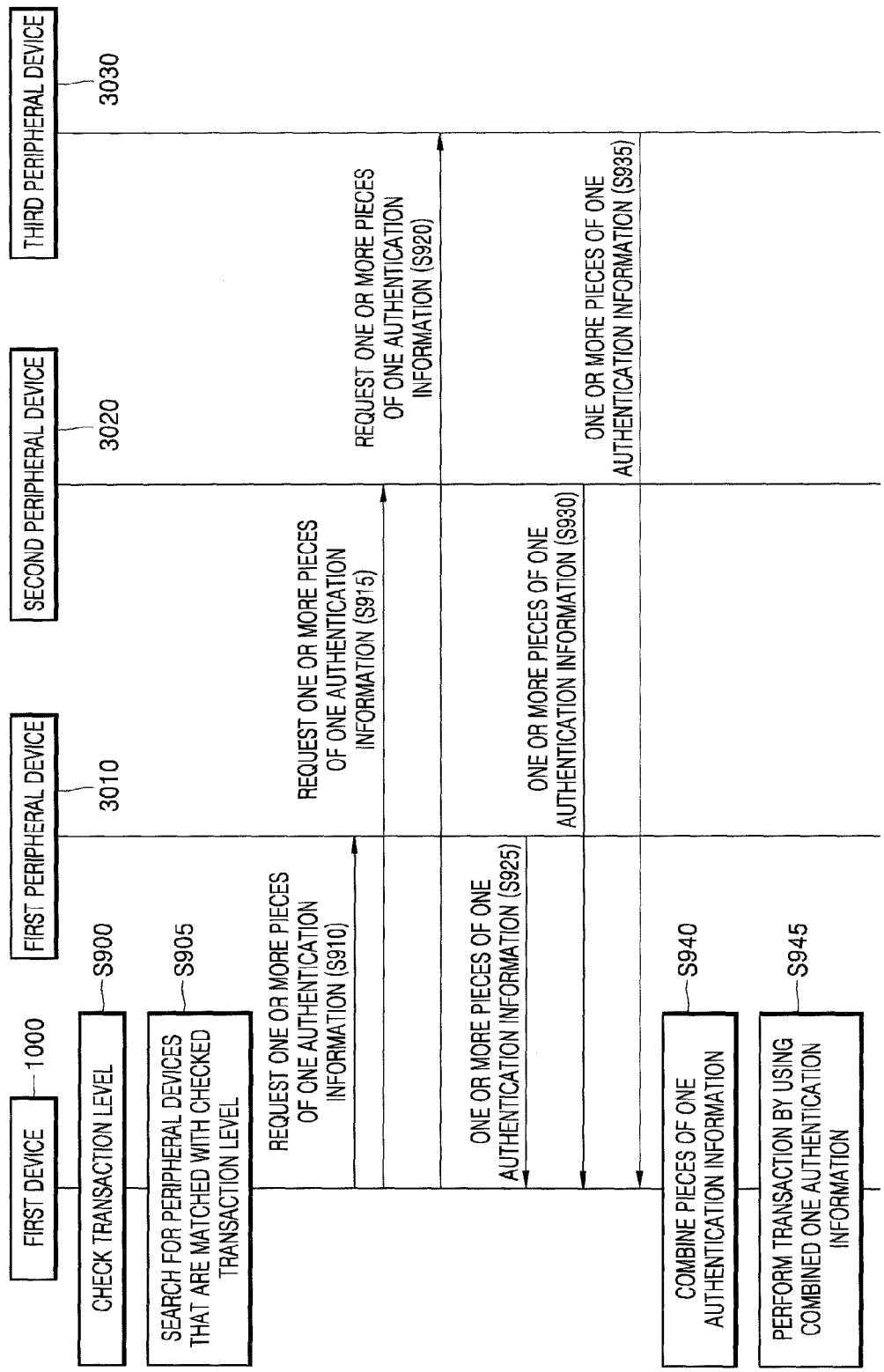
FIG. 9 is a flowchart of a method of performing a transaction by combining pieces of one authentication information which are transmitted by first, second, and third peripheral devices, the method performed by a first device according to an embodiment of the present disclosure.

FIG. 9 is a flowchart of a method of performing a transaction by combining pieces of one authentication information which are transmitted by first, second, and third peripheral devices, the method performed by the first device according to an embodiment of the present disclosure.

Referring to FIG. 9, in operation S900 the first device 1000 determines a transaction level. The transaction level may be set according to a security need. For example, the transaction level may be set based on a transaction amount, a transaction location, and a transaction method.

In operation S905, the first device 1000 searches for peripheral devices that are matched with the determined transaction level. For example, one or more search-target peripheral devices may be previously matched with at least one of the transaction amount, the transaction location, and the transaction method. Also, the first device 1000 may search for specified peripheral devices, based on at least one of the transaction amount, the transaction location, and the transaction method.

In operation S910, the first device 1000 may request the first peripheral device 3010 for one or more pieces of the one authentication information, in operation S915, the first device 1000 may request the second peripheral device 3020 for one or more pieces of the one authentication information, and in operation S920, the first device 1000 may request the third peripheral device 3030 for one or more pieces of the one authentication information. For example, the one authentication information may be divided into the pieces, and the pieces of the one authentication information may be previously stored in the first, second, and third peripheral devices 3010, 3020, and 3030, respectively. The one authentication information may be a certificate issued by an authentication agency but one or more various embodiments of the present disclosure are not limited thereto.

In operation S925, the first peripheral device 3010 provides the one or more pieces of the one authentication information to the first device 1000, in response to a request from the first device 1000, in operation S930, the second peripheral device 3020 provides the one or more pieces of the one authentication information to the first device 1000, in response to a request from the first device 1000, and in operation S935, the third peripheral device 3030 provides the one or more pieces of the one authentication information to the first device 1000, in response to a request from the first device 1000.

In operation S940, the first device 1000 combines the pieces of the one authentication information. The first device 1000 may obtain the one authentication information as a whole by combining the pieces of the one authentication information which are received from the first, second, and third peripheral devices 3010, 3020, and 3030, respectively.

In operation S945, the first device 1000 performs the transaction by using the combined one authentication information. The first device 1000 may transmit the combined one authentication information to the transaction server 4000 and may perform the transaction with the transaction server 4000.

Figure 10:
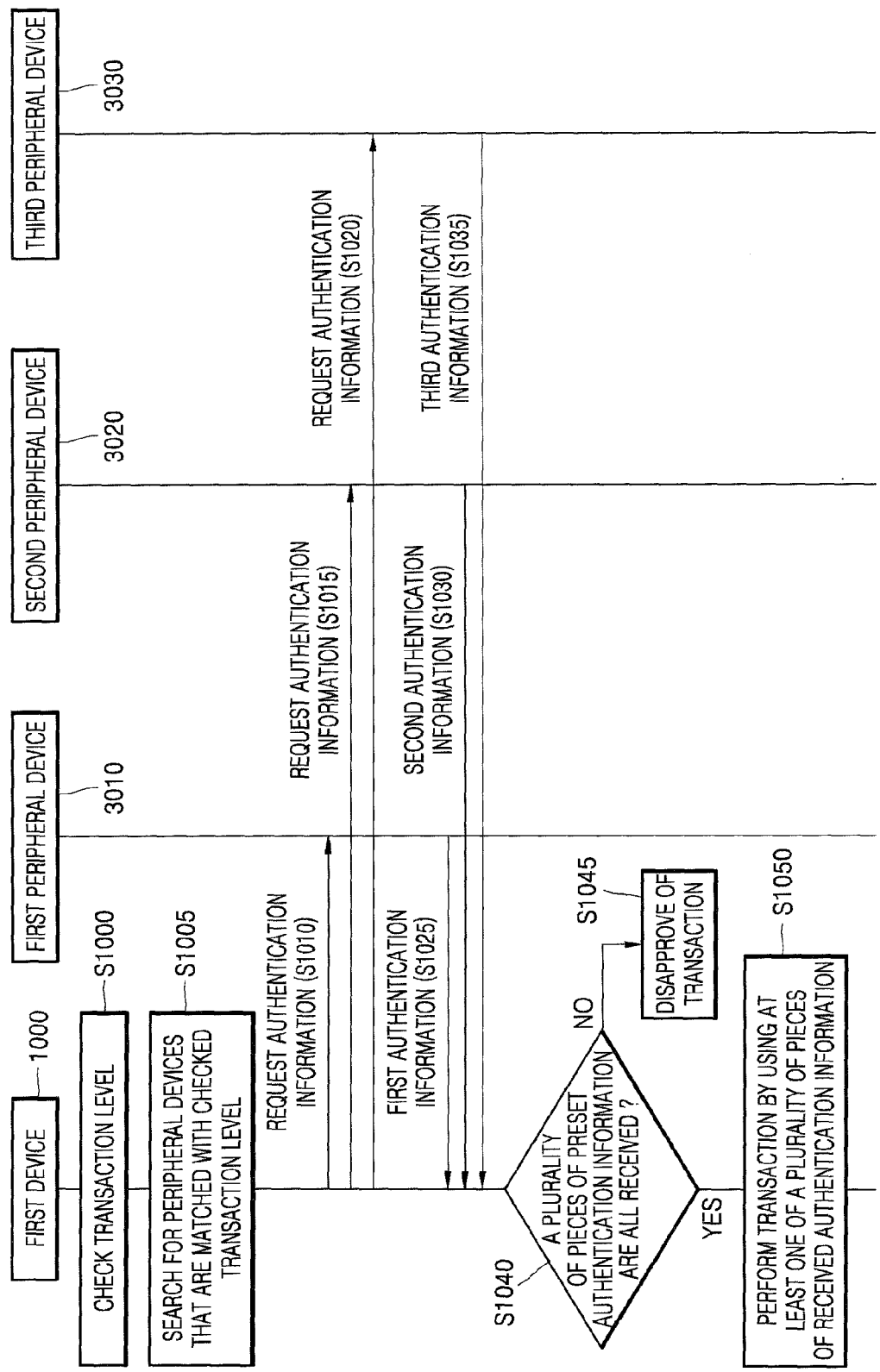
FIG. 10 is a flowchart of a method of receiving a plurality of pieces of different authentication information from one or more peripheral devices and performing a transaction, the method performed by a first device according to an embodiment of the present disclosure.

FIG. 10 is a flowchart of a method of receiving a plurality of pieces of different authentication information from one or more peripheral devices and performing a transaction, the method performed by a first device according to an embodiment of the present disclosure.

Referring to FIG. 10, in operation S1000 the first device 1000 determines a transaction level. The transaction level may be set according to a security need. For example, the transaction level may be set based on a transaction amount, a transaction location, and a transaction method.

In operation S1005, the first device 1000 searches for peripheral devices that are matched with the determined transaction level. For example, one or more search-target peripheral devices may be previously matched with at least one of the transaction amount, the transaction location, and the transaction method. Also, the first device 1000 may search for specified peripheral devices, based on at least one of the transaction amount, the transaction location, and the transaction method.

In operation S1010, the first device 1000 may request a first peripheral device 3010 for authentication information, in operation S1015, the first device 1000 may request a second peripheral device 3020 for authentication information, and in operation S1020, the first device 1000 may request a third peripheral device 3030 for authentication information. For this, the plurality of pieces of different authentication information may be previously stored in the first, second, and third peripheral devices 3010, 3020, and 3030, respectively. For example, first authentication information may be previously stored in the first peripheral device 3010, second authentication information may be previously stored in the second peripheral device 3020, and third authentication information may be previously stored in the third peripheral device 3030. Also, each of the first, second, and third authentication information may be a certificate issued by an authentication agency but various embodiments of the present disclosure are not limited thereto.

In operation S1025, the first peripheral device 3010 provides the first authentication information to the first device 1000, in response to a request from the first device 1000, in operation S1030, the second peripheral device 3020 provides the second authentication information to the first device 1000, in response to a request from the first device 1000, and in operation S1035, the third peripheral device 3030 provides the third authentication information to the first device 1000, in response to a request from the first device 1000.

In operation S1040, the first device 1000 determines whether a plurality of pieces of specified authentication information are all received. According to each of transaction levels, one or more search-target peripheral devices and one or more pieces of authentication information to receive may be preset. Based on the transaction level determined in operation S1000, the first device 1000 may determine whether the plurality of pieces of specified authentication information are all received. Also, based on the transaction level determined in operation S1000, the first device 1000 may determine whether the plurality of pieces of specified authentication information are all received from the one or more specified peripheral devices.

As a result of the determination, when not all of the plurality of pieces of specified authentication information are received, in operation S1045, the first device 1000 disapproves the transaction.

As a result of the determination, when the plurality of pieces of specified authentication information are all received, in operation S1050 the first device 1000 performs the transaction by using at least one of the first, second, and third authentication information. The first device 1000 may transmit at least one of the first, second, and third authentication information to the transaction server 4000 and may perform the transaction with the transaction server 4000.

Figure 11:
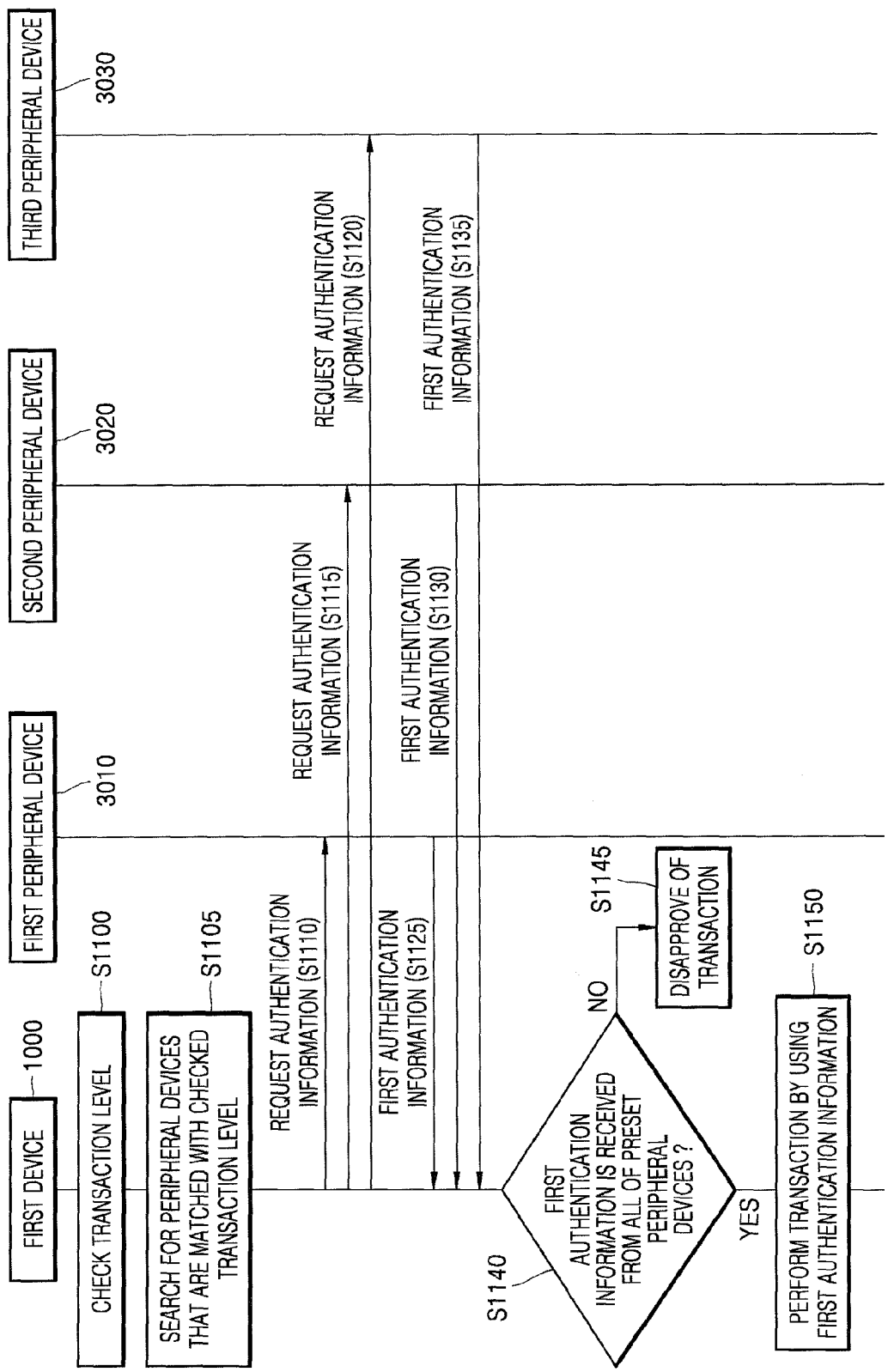
FIG. 11 is a flowchart of a method of repeatedly receiving same authentication information from one or more peripheral devices and performing a transaction, the method performed by a first device according to an embodiment of the present disclosure.

FIG. 11 is a flowchart of a method of repeatedly receiving same authentication information from one or more peripheral devices and performing a transaction the method performed by a first device, according to an embodiment of the present disclosure.

Referring to FIG. 11, in operation S1100 the first device 1000 determines a transaction level. The transaction level may be set according to a security need. For example, the transaction level may be set based on a transaction amount, a transaction location, and a transaction method.

In operation S1105, the first device 1000 searches for peripheral devices that are matched with the determined transaction level. For example, one or more search-target peripheral devices may be previously matched with at least one of the transaction amount, the transaction location, and the transaction method. Also, the first device 1000 may search for specified peripheral devices, based on at least one of the transaction amount, the transaction location, and the transaction method.

In operation S1110, the first device 1000 requests a first peripheral device 3010 for authentication information, in operation S1115, the first device 1000 requests a second peripheral device 3020 for the authentication information, and in operation S1120, the first device 1000 requests a third peripheral device 3030 for the authentication information. That is, the authentication information may be previously stored in each of the first, second, and third peripheral devices 3010, 3020, and 3030. For example, first authentication information may be previously stored in each of the first, second, and third peripheral devices 3010, 3020, and 3030. The authentication information or the first authentication information may be a certificate issued by an authentication agency but various embodiments of the present disclosure are not limited thereto.

In operation S1125, the first peripheral device 3010 provides the first authentication information to the first device 1000 in response to a request from the first device 1000, and in operation S1130 the second peripheral device 3020 provides the first authentication information to the first device 1000 in response to a request from the first device 1000, and in operation S1135 the third peripheral device 3030 provides the first authentication information to the first device 1000 in response to a request from the first device 1000.

In operation S1140, the first device 1000 determines whether the first authentication information is received from all of the specified peripheral devices. According to each of transaction levels, one or more search-target peripheral devices and authentication information to receive may be preset. Based on the transaction level determined in operation S1100, the first device 1000 may determine whether the specified authentication information is received from all of the specified peripheral devices.

As a result of the determination, when the first authentication information is not received from at least one of the first, second, and third peripheral devices 3010, 3020, and 3030, in operation S1145, the first device 1000 disapproves the transaction.

As a result of the determination, when the first authentication information is received from all of the first, second, and third peripheral devices 3010, 3020, and 3030, in operation S1150, the first device 1000 performs the transaction by using the first authentication information. The first device 1000 may transmit the first authentication information to the transaction server 4000 and may perform the transaction with the transaction server 4000.

Figure 12:
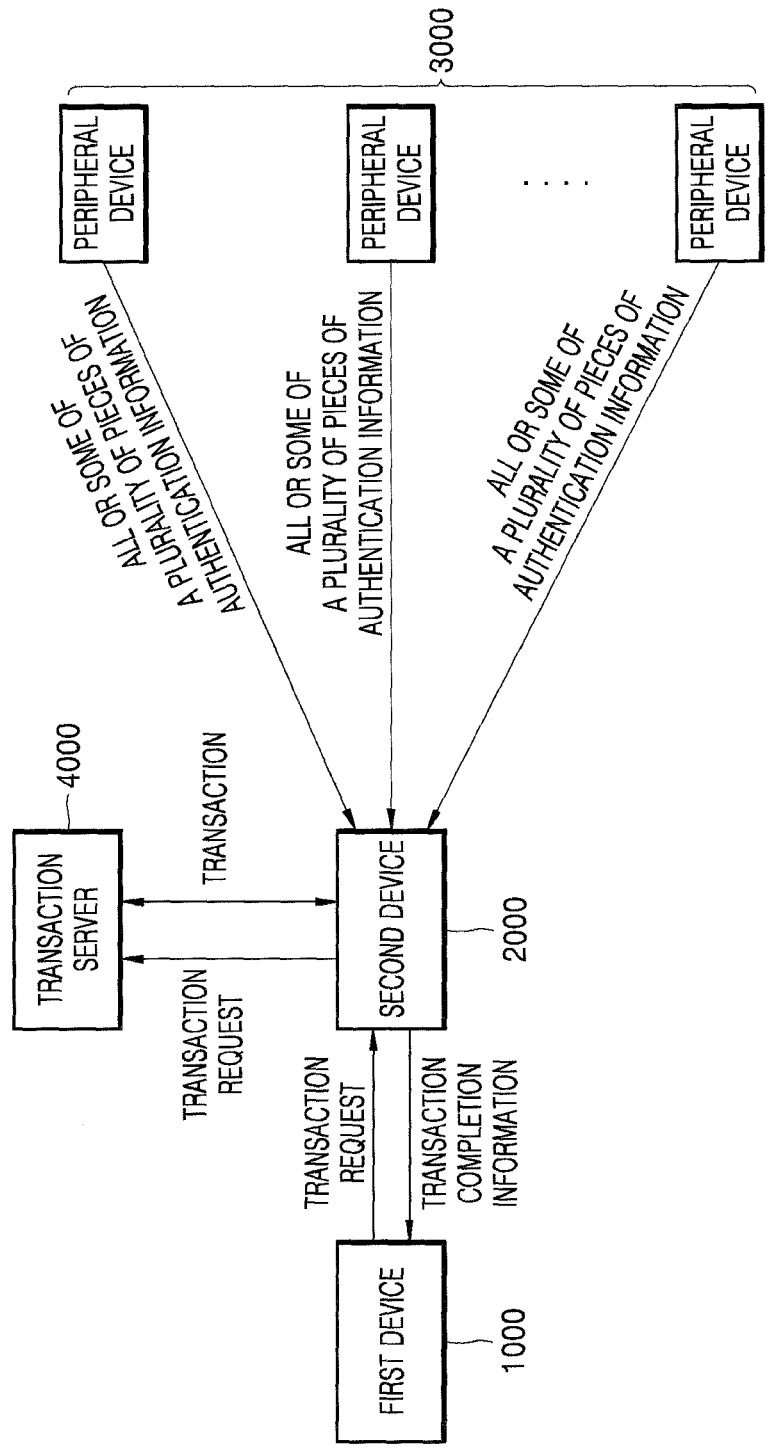
FIG. 12 illustrates a transaction system for allowing a second device to perform a transaction by using authentication information received from one or more peripheral devices in response to a transaction request from a first device according to an embodiment of the present disclosure.

FIG. 12 illustrates a transaction system for allowing a second device to perform a transaction by using all or some of a plurality of pieces of authentication information received from peripheral devices, in response to a transaction request from a first device according to an embodiment of the present disclosure.

Referring to FIG. 12, the first device 1000 may transmit the transaction request to the second device 2000, and the second device 2000 may receive the transaction request and may search for the peripheral devices 3000 that correspond to a transaction level. Also, the second device 2000 may receive all or some of the plurality of pieces of authentication information from the peripheral devices 3000. The second device 2000 may perform the transaction with the transaction server 4000 by using all or some of the plurality of pieces of authentication information.

Figure 13:
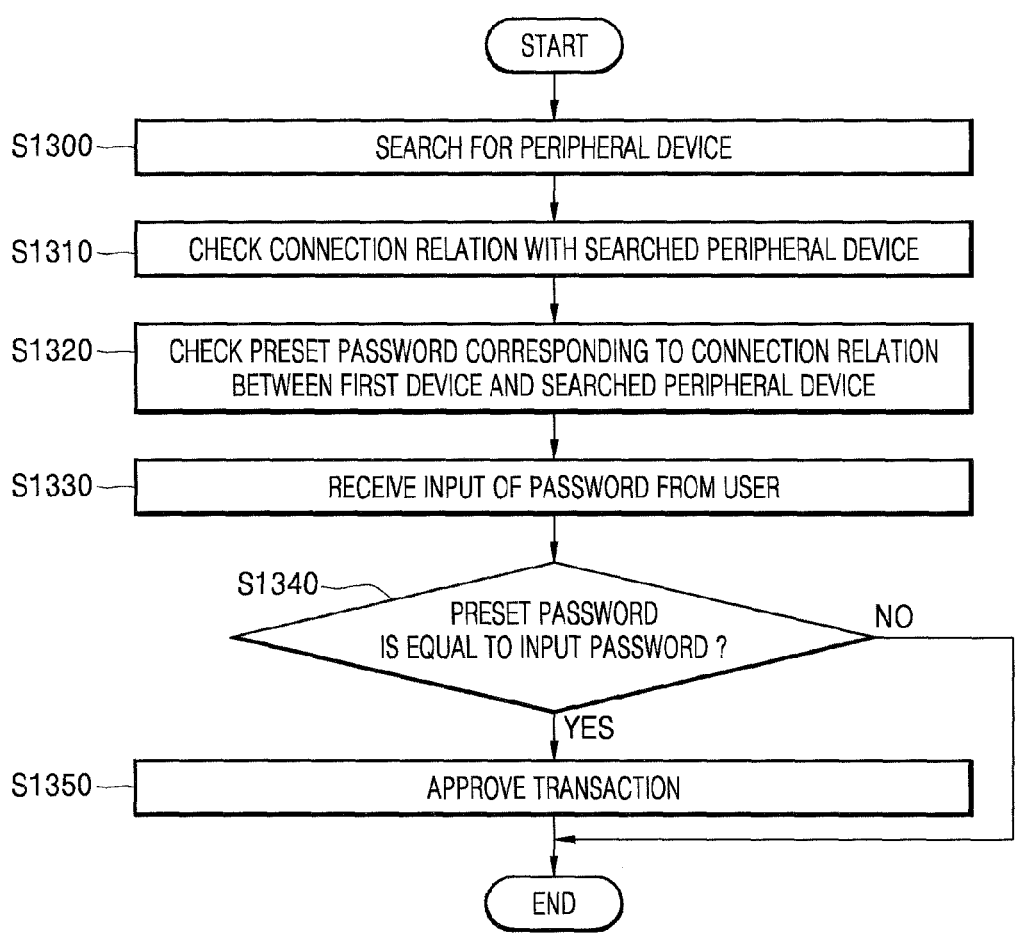
FIG. 13 is a flowchart of a method of approving a transaction by using a specified password corresponding to a connection relation between a first device and a searched peripheral device, the method performed by the first device according to an embodiment of the present disclosure.

FIG. 13 is a flowchart of a method of approving a transaction by using a specified password corresponding to a connection relation between a first device and a searched peripheral device, the method performed by a first device according to an embodiment of the present disclosure.

Referring to FIG. 13, in operation S1300, the first device 1000 searches for the peripheral device 3000. The first device 1000 searches for the peripheral device 3000 near the first device 1000 and obtains peripheral device information about the searched peripheral device 3000. The peripheral device information may include, but is not limited to, a plurality of pieces of information about an ID value (e.g., an SSID, a model name, a model number, etc.) of the searched peripheral device 3000, a type of the searched peripheral device 3000, information about a device to which the searched peripheral device 3000 is connected, and information about a function of the searched peripheral device 3000.

The first device 1000 may receive the ID value of the searched peripheral device 3000 from the searched peripheral device 3000 and may obtain the peripheral device information from a server (not shown), based on the received ID value of the searched peripheral device 3000, but various embodiments of the present disclosure are not limited thereto.

Also, the first device 1000 may search for the peripheral device 3000 by using NFC, ZigBee communication, RFID communication, UWB communication, or Bluetooth communication, but various embodiments of the present disclosure are not limited thereto.

In operation S1310, the first device 1000 determines the connection relation with the searched peripheral device 3000. The first device 1000 may determine how the first device 1000 and the searched peripheral device 3000 are connected.

The fact that the first device 1000 determines how the first device 1000 and the searched peripheral device 3000 are connected may mean that the first device 1000 determines a topology established by the first device 1000 and the searched peripheral device 3000. Here, the term "topology" means an arrangement of devices or nodes. The topology may include physical topology and logical topology and may be defined according to physical or logical connection between the devices that belong to a topology structure. For example, the topology may differ from another topology due to at least one of, but is not limited to, cooperative relationship between the devices, a method of connecting the devices, a data transmission speed between the devices, a flow of data exchanged between the devices, a type of a signal exchanged between the devices, and a type of an application installed in each of the devices.

In operation S1320, the first device 1000 determines the specified password corresponding to the connection relation between the first device 1000 and the searched peripheral device 3000. The password corresponding to the connection relation between the first device 1000 and the searched peripheral device 3000 may be specified and stored in the first device 1000.

In operation S1330, the first device 1000 receives an input of a password from a user, and in operation S1340, the first device 1000 determines whether the specified password corresponds to the input password.

As a result of the determination (in operation S1340), when the specified password corresponds to the input password, in operation S1350, the first device 1000 approves the transaction.

Figure 14:
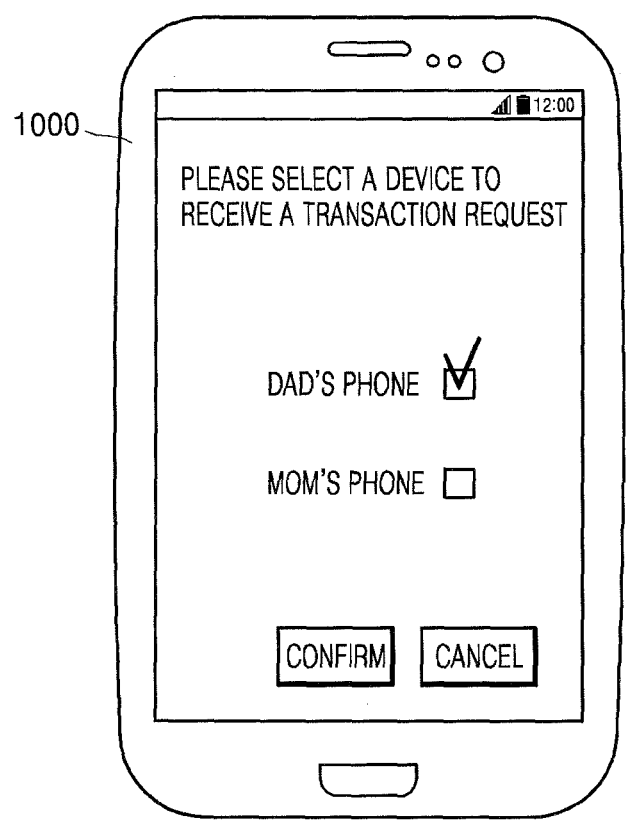
FIG. 14 illustrates an example in which a first device selects a second device to receive a transaction request, based on a user input according to an embodiment of the present disclosure.

FIG. 14 illustrates an example in which a first device selects a second device to receive a transaction request, based on a user input according to an embodiment of the present disclosure.

Referring to FIG. 14, the first device 1000 may display, on a screen of the first device 1000, a list of one or more searched second devices 2000 so as to transmit the transaction request. The first device 1000 may select the second device 2000 to receive the transaction request, based on the user input of selecting one of the one or more searched second devices 2000. In this case, a transaction application for providing the transaction method may be installed in each of the one or more searched second devices 2000.

Figure 15:
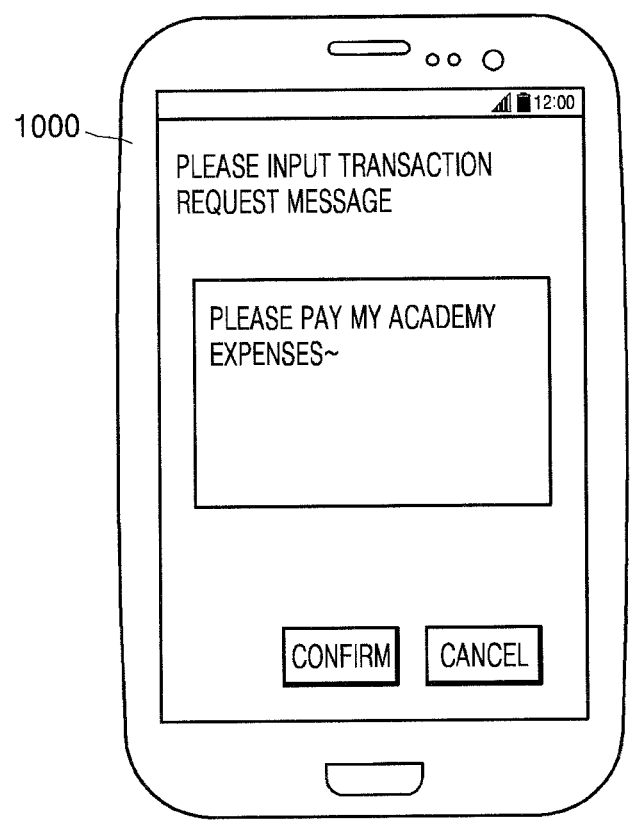
FIG. 15 illustrates an example in which a first device generates a transaction request message, based on a user input according to an embodiment of the present disclosure.

FIG. 15 illustrates an example in which a first device generates a transaction request message, based on a user input according to an embodiment of the present disclosure.

Referring to FIG. 15, the first device 1000 may display an input window for generation of the transaction request message on a screen of the first device 1000. A user of the first device 1000 may enter a transaction request message "Please, pay my academy expenses" into the input window, and the first device 1000 may generate the transaction request message based on the message input by the user.

Figure 16B:
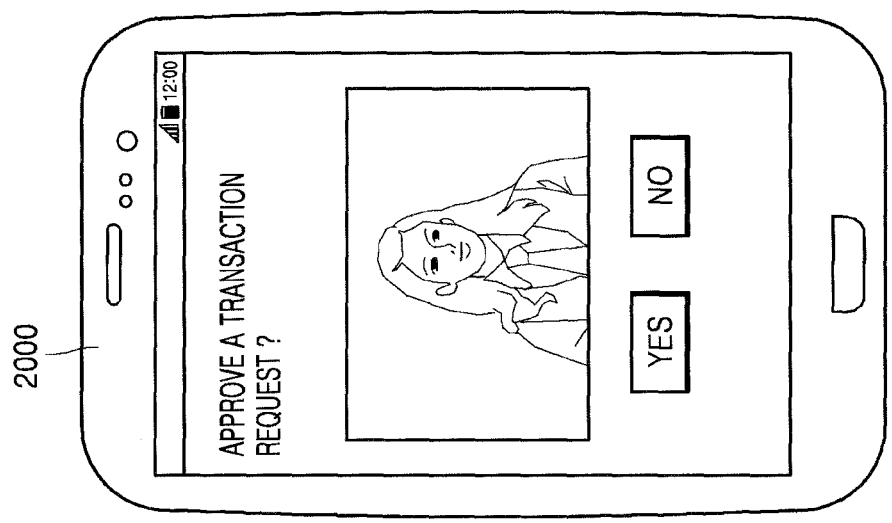
FIGS. 16A and 16B illustrates an example in which a second device connects a video call with a first device so as to approve a transaction request from the first device according to an embodiment of the present disclosure.
Figure 16A:
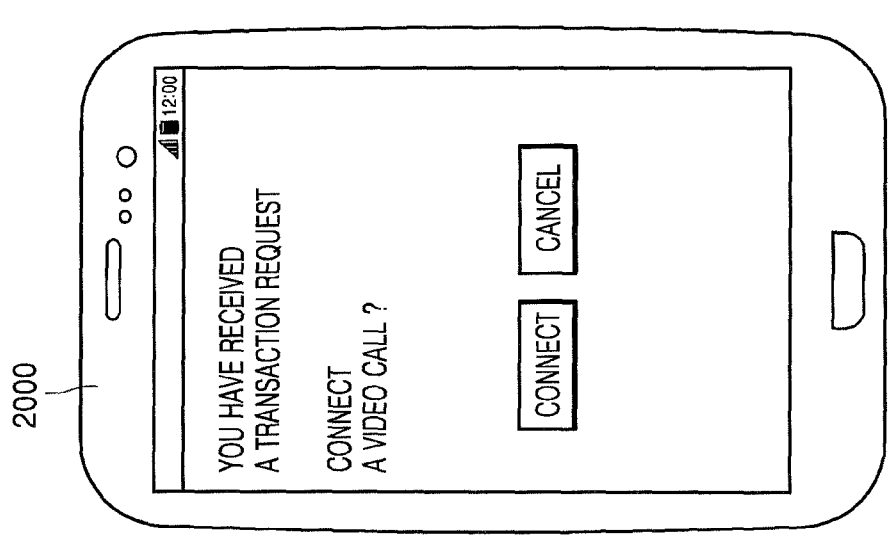

FIGS. 16A and 16B illustrate an example in which a second device connects a video call with a first device so as to approve a transaction request from the first device according to an embodiment of the present disclosure.

Referring to FIG. 16A, when the second device 2000 receives the transaction request from the first device 1000, the second device 2000 may display a UI on a screen of the second device 2000 so as to determine whether to connect the video call with the first device 1000.

In order to verify a user of the first device 1000 that has transmitted transaction request, when a user of the second device 2000 touches a selection button for connecting the video call, referring to FIG. 16B, the second device 2000 may perform the video call with the first device 1000.

Also, the second device 2000 may display an UI for determining whether to approve the transaction request on a screen of the video call with the first device 1000.

Figure 17:
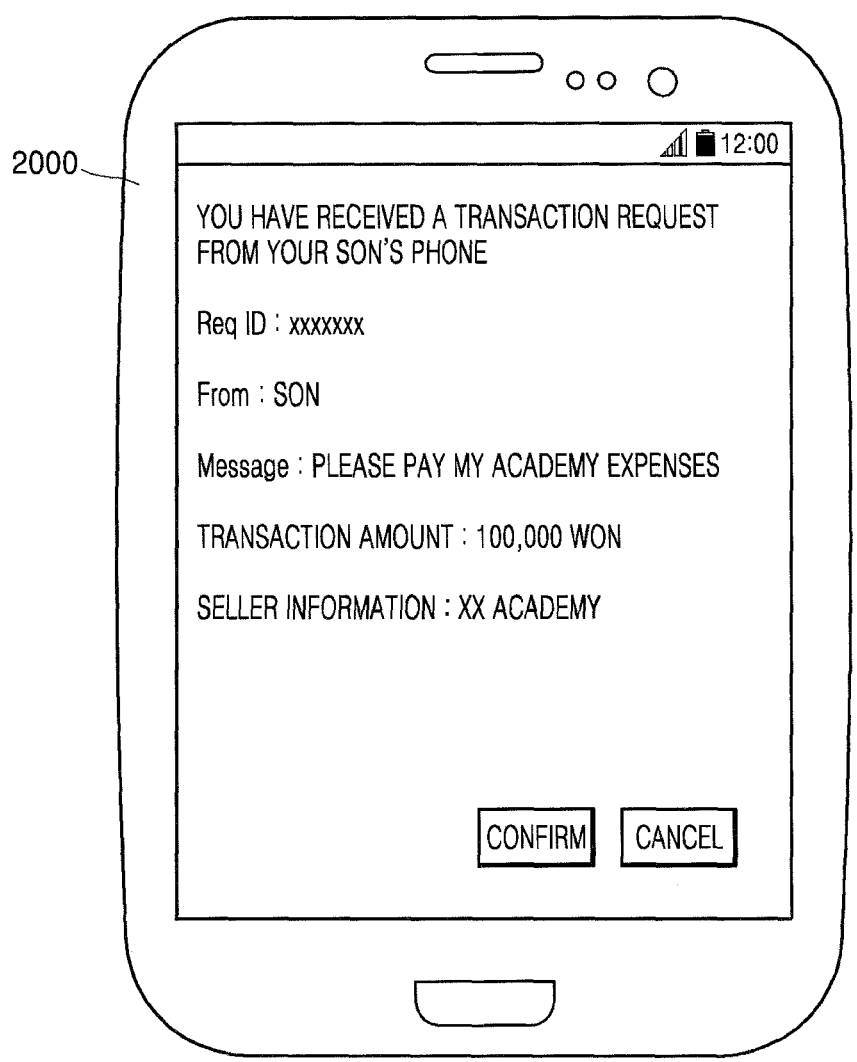
FIG. 17 illustrates an example in which transaction information and a transaction request message are displayed on a screen of a second device according to an embodiment of the present disclosure.

FIG. 17 illustrates an example in which transaction information and a transaction request message are displayed on a screen of a second device according to an embodiment of the present disclosure.

Referring to FIG. 17, the second device 2000 may receive a transaction request from the first device 1000 and may display the transaction information and the transaction request message, which are received from the first device 1000, on the screen of the second device 2000.

The second device 2000 may display an ID of the first device 1000, an ID value of a user of the first device 1000, a transaction amount, an ID value of a seller, and the transaction request message, but various embodiments of the present disclosure are not limited thereto.

Also, a user of the second device 2000 may determine the transaction information and the transaction request message displayed on the screen of the second device 2000, and may determine whether to perform a transaction on behalf of the first device 1000.

Figure 18:
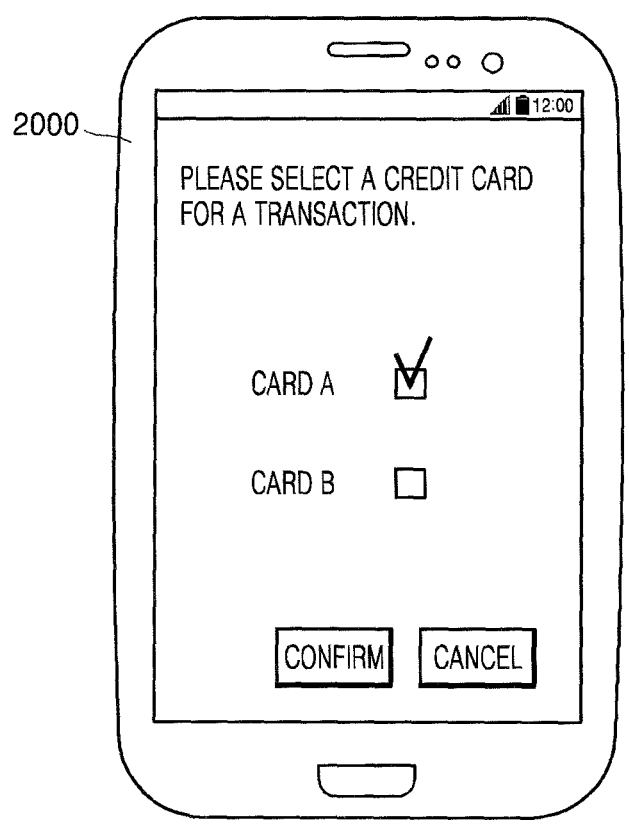
FIG. 18 illustrates an example in which a second device selects a transaction method according to an embodiment of the present disclosure.

FIG. 18 illustrates an example in which a second device selects a transaction method according to an embodiment of the present disclosure.

Referring to FIG. 18, for example, when the second device 2000 selects a transaction via a credit card, a list of credit cards that are available in the transaction by the second device 2000 may be displayed on a screen of the second device 2000.

Figure 19:
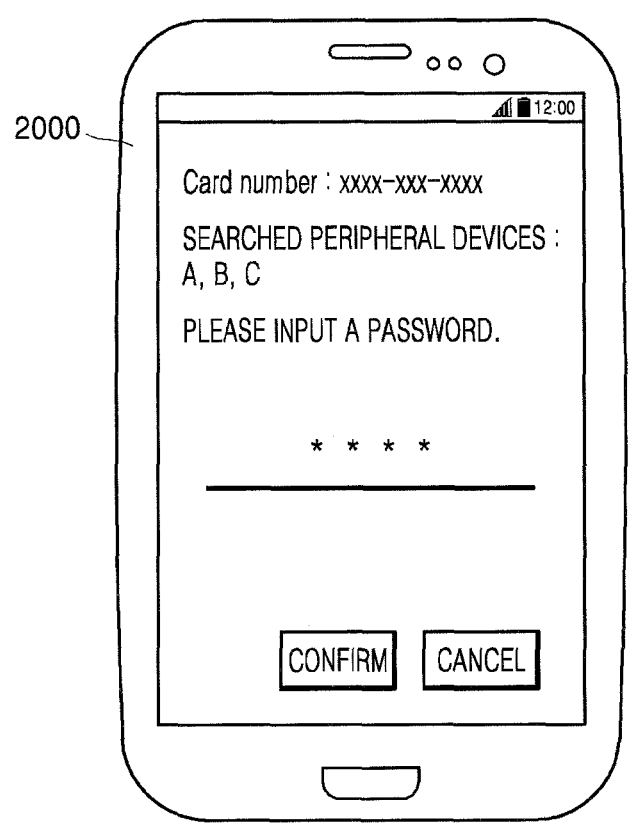
FIG. 19 illustrates an example of a password input window that is displayed on a screen of a second device for transaction authentication according to an embodiment of the present disclosure.

FIG. 19 illustrates an example of a password input window that is displayed on a screen of a second device for transaction authentication according to an embodiment of the present disclosure.

Referring to FIG. 19, the second device 2000 may display the password input window for transaction authentication on the screen of the second device 2000. The password input window may include a list of one or more peripheral devices 3000 that are searched for by the second device 2000, and a password input UI.

Thus, a user of the second device 2000 may recognize which peripheral devices 3000 are searched for by the second device 2000, and may input a password that is matched with the searched peripheral device 3000 into the second device 2000 via the password input UI.

Figure 20:
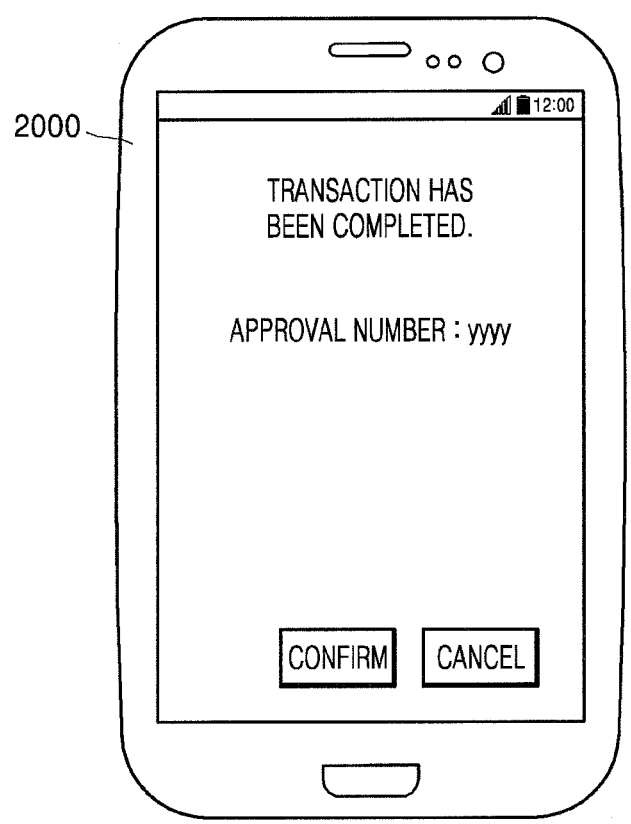
FIG. 20 illustrates an example in which transaction completion information is displayed on a screen of a first device according to an embodiment of the present disclosure.

FIG. 20 illustrates an example in which transaction completion information is displayed on a screen of a first device according to an embodiment of the present disclosure.

Referring to FIG. 20, the first device 1000 may receive the transaction completion information from the second device 2000 or the transaction server 4000, and may display the transaction completion information on the screen of the first device 1000. The transaction completion information may be an approval number, but various embodiments of the present disclosure are not limited thereto. Also, the first device 1000 may complete a purchase of a product by using the transaction completion information.

Figure 21:
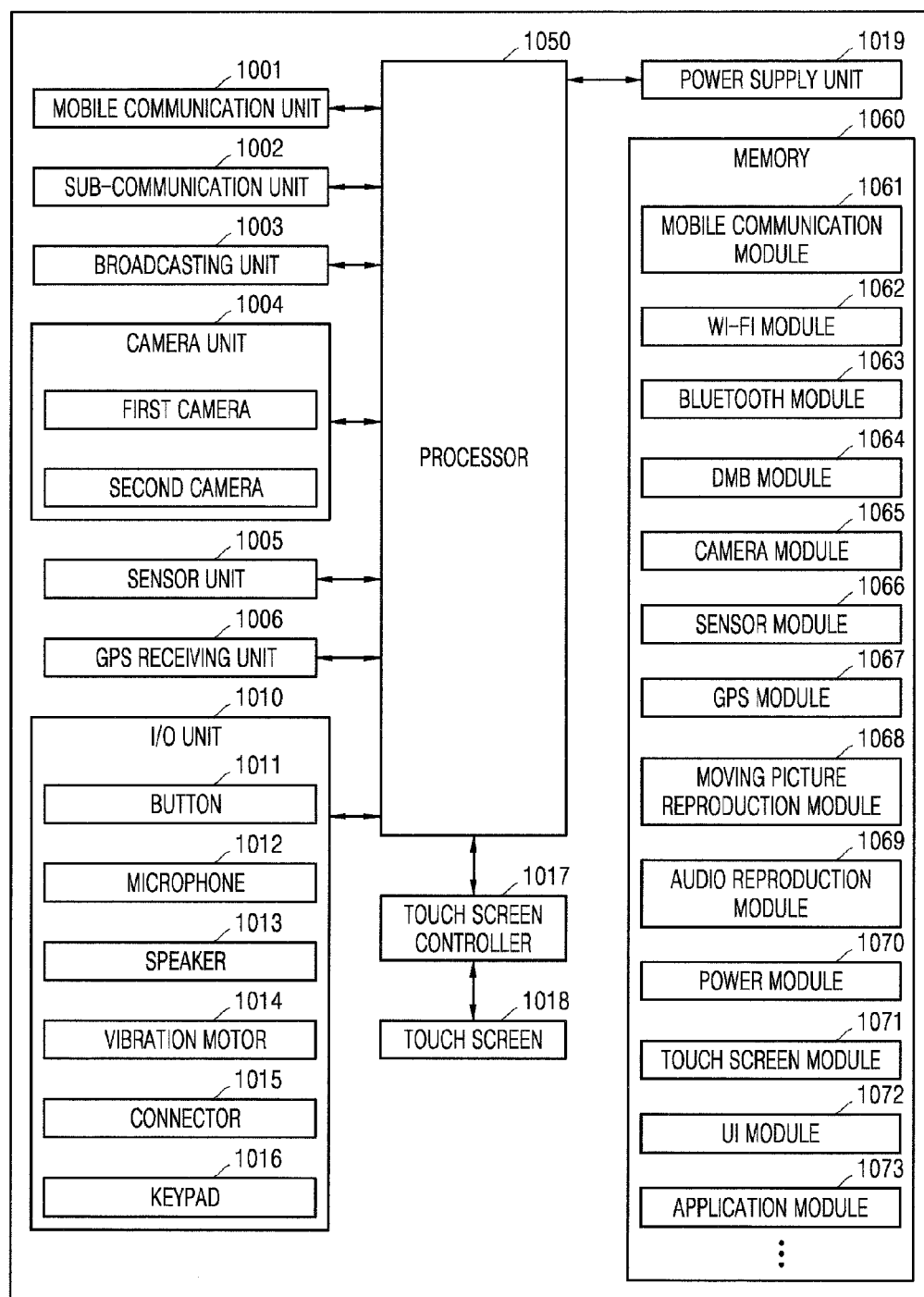
FIG. 21 is a block diagram of a device according to an embodiment of the present disclosure.

FIG. 21 is a block diagram of a device according to an embodiment of the present disclosure. The device shown in FIG. 21 may be a first device or a second device.

Referring to FIG. 21, a mobile communication unit 1001 performs a call set-up, data communication, or the like with a base station via a cellular network such as third Generation (3G)/fourth Generation (4G). A sub-communication unit 1002 performs a function for short-distance communication such as Bluetooth or NFC. A broadcasting unit 1003 receives a Digital Multimedia Broadcasting (DMB) signal.

A camera unit 1004 includes a lens and optical elements used to capture a still image or a moving picture.

A sensor unit 1005 may include a gravity sensor for sensing motion of the device, an illuminance sensor for sensing intensity of light, a proximity sensor for sensing proximity of a person, a motion sensor for sensing motion of a person, or the like.

A GPS receiving unit 1006 receives a GPS signal from a satellite. By using the GPS signal, various services may be provided to a user.

An Input/Output (I/O) unit 1010 provides an interface for an external device or a person, and includes a button 1011, a microphone 1012, a speaker 1013, a vibration motor 1014, a connector 1015, and a keypad 1016.

A touch screen 1018 receives a touch input by the user. A touch screen controller 1017 transfers, to a control unit (also referred as the processor) 1050, a touch input that is input via the touch screen 1018. A power supply unit 1019 is connected to a battery or an external power source so as to supply power for the device.

The processor 1050 requests or performs a transaction by executing programs stored in a memory 1060.

The programs stored in the memory 1060 may be divided into a plurality of modules according to their functions. That is, the programs stored in the memory 1060 may be divided into a mobile communication module 1061, a Wi-Fi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a User Interface (UI) module 1072, an application module 1073, or the like.

Functions of the modules may be well known by their respective titles by one of ordinary skill in the art, and thus only the application module 1073 is described below.

First, it is assumed that the device of FIG. 21 is the first device 1000.

In a case where the device of FIG. 21 is the first device 1000 and transmits a transaction request to the second device 2000, the application module 1073 searches for the second device 2000. The application module 1073 may search for the second device 2000 by using the mobile communication module 1061, the Wi-Fi module 1062, and the Bluetooth module 1063. Also, the application module 1073 may search for the second device 2000 in which a transaction application for providing the transaction method is installed. The application module 1073 may send a query to the second device 2000 so as to ask whether the transaction application for providing the transaction method is installed in the second device 2000, and when the transaction application is installed in the second device 2000, the application module 1073 may select the second device 2000 as a transaction device.

The application module 1073 transmits the transaction request to the second device 2000. The application module 1073 may obtain transaction information and may generate a transaction request message. Also, the application module 1073 may transmit the transaction information and the transaction request message to the second device 2000. The transaction information may be related to a product and a transaction for the product and may include a plurality of pieces of information about a name of the product, a price of the product, a transaction amount, a model name of the product, a manufacturer, a seller of the product, and a transaction location. Also, the transaction request message may be generated by a user of the first device 1000 so as to request a user of the second device 2000 for the transaction.

The application module 1073 may complete a purchase of the product by using transaction completion information received from the second device 2000.

In a case where the device of FIG. 21 is the first device 1000, and does not request the second device 2000 for a transaction but performs the transaction with the transaction server 4000, the application module 1073 may search for one or more peripheral devices 3000. The application module 1073 may determine a position of the first device 1000 by using the mobile communication module 1061, the Wi-Fi module 1062, and the GPS module 1067. Also, the application module 1073 may search for the specified peripheral device 3000 based on the position of the first device 1000 and a transaction amount. When the specified peripheral device 3000 is searched for based on the position of the first device 1000 and the transaction amount, the application module 1073 may perform the transaction with the transaction server 4000.

The application module 1073 may receive all or some of pieces of one authentication information from the searched one or more peripheral devices 3000 via the mobile communication unit 1001 and the sub-communication unit 1002. The application module 1073 may combine the pieces of the one authentication information from the searched one or more peripheral devices 3000 and may authenticate the transaction by using the combined one authentication information. Also, the application module 1073 may repeatedly receive same authentication information from the peripheral devices 3000, and when the application module 1073 receives the authentication information from the specified peripheral devices 3000, the application module 1073 may perform the transaction by using the authentication information. Also, the application module 1073 may receive a plurality of pieces of different authentication information from the peripheral devices 3000, respectively, and may authenticate the transaction by using at least one of the plurality of pieces of different authentication information.

Also, the application module 1073 may be set to identify a password for the transaction according to a connection relation between the peripheral device 3000 and the first device 1000.

Hereinafter, it is assumed that the device of FIG. 21 is the second device 2000.

In a case where the device of FIG. 21 is the second device 2000 and performs a transaction in response to a transaction request from the first device 1000, the application module 1073 may determine the transaction request from the first device 1000, and may approve the transaction request based on a user input.

The application module 1073 may display a window on the touch screen 1018, wherein the window includes transaction information and a transaction request message received from the first device 1000.

When the transaction request is received from the first device 1000, the application module 1073 may connect a video call with the first device 1000 by using the mobile communication unit 1001 and the sub-communication unit 1002. Also, the application module 1073 may approve the transaction request from the first device 1000, based on an input from a user of the second device 2000 who performs the video call.

Also, the application module 1073 may search for one or more peripheral devices 3000. The application module 1073 may determine a position of the second device 2000 by using the mobile communication module 1061, the Wi-Fi module 1062, and the GPS module 1067. Also, the application module 1073 may search for the specified peripheral device 3000 based on the position of the second device 2000 and a transaction amount. When the specified peripheral device 3000 is searched for based on the position of the second device 2000 and the transaction amount, the application module 1073 may perform the transaction with the transaction server 4000.

Also, the application module 1073 may receive all or some of pieces of one authentication information from the searched one or more peripheral devices 3000 via the mobile communication unit 1001 and the sub-communication unit 1002. The application module 1073 may combine the pieces of the one authentication information from the searched one or more peripheral devices 3000 and may authenticate the transaction by using the combined one authentication information. Also, the application module 1073 may repeatedly receive same authentication information from the peripheral devices 3000, and when the application module 1073 receives the authentication information from the specified peripheral devices 3000, the application module 1073 may perform the transaction by using the authentication information. Also, the application module 1073 may receive a plurality of pieces of different authentication information from the peripheral devices 3000, respectively, and may authenticate the transaction by using at least one of the plurality of pieces of different authentication information. Also, the application module 1073 may be set to identify a password for the transaction according to a connection relation between the peripheral device 3000 and the second device 2000. The application module 1073 may perform the transaction with the transaction server 4000 and may provide transaction completion information to the first device 1000.

While the application module 1073 is briefly described above with respect to its functions, functions of the application module 1073 are not limited thereto, thus, particular functions of the application module 1073 may be derived with reference to FIGS. 1 through 20.

Figure 22:
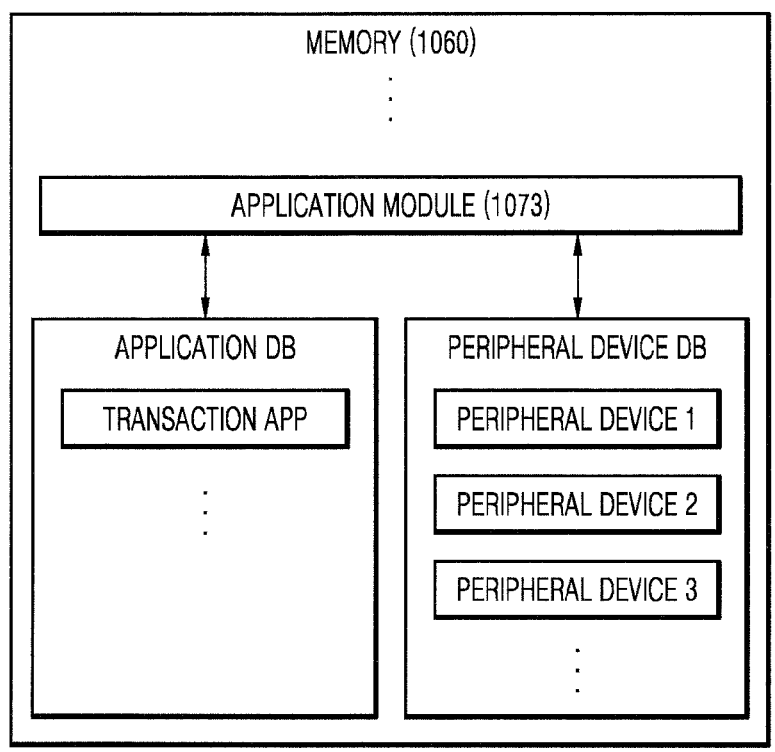
FIG. 22 illustrates a memory including an application DataBase (DB) and a peripheral device DB according to an embodiment of the present disclosure.

FIG. 22 illustrates a memory including an application DataBase (DB) and a peripheral device DB, according to an embodiment of the present disclosure.

Referring to FIG. 22, the application module 1073 in the memory 1060 may be connected to the application DB and the peripheral device DB.

The application DB may store at least one transaction application for providing a transaction service. The application module 1073 may receive a transaction request or may perform a transaction by using the at least one transaction application.

The peripheral device DB may store one or more pieces of peripheral device information about the searched one or more peripheral devices 3000. The one or more pieces of peripheral device information may be used in determining whether to perform the transaction.

Various embodiments of the present disclosure may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all of volatile and non-volatile medium, and detachable and non-detachable medium which are designed to store information including computer readable commands, data structures, program modules or other data. The communication medium includes computer-readable commands, a data structure, a program module, and other transmission mechanisms, and includes other information transmission mediums.

It should be understood that the various embodiments described therein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of securing a network transaction, the method performed by a device on behalf of a first external device, and the method comprising:

receiving, via a first network interface of the device, transaction information including a transaction request requesting the transaction, the transaction information being received from the first external device;

determining, by a computer processor of the device, a position of the device using at least one of global position system (GPS) sensor information and access point (AP) information;

searching, by the computer processor of the device, for a second external device based on the position of the device and the transaction information;

receiving, via a second network interface of the device, authentication information from the searched for second external device through near field communication or Bluetooth communication;

authenticating the transaction, via an application stored in memory of the device, using the authentication information; and performing, using the computer processor of the device, the transaction with a transaction server by using the transaction information and the authentication information received from the second external device.

2. The method of claim 1, wherein the information received from the second external device further comprises an IDentification (ID) value of the second external device, and wherein the performing comprises performing the transaction after determining that the second external device is a specified second external device.

3. The method of claim 2, wherein the specified second external device is set according to the position of the device.

4. The method of claim 2, wherein the specified second external device is set according to an amount of the transaction requested by the first external device.

5. The method of claim 1, wherein the information received from the second external device comprises authentication information stored in the second external device, and wherein the performing comprises performing the transaction by using the authentication information received from the second external device.

6. The method of claim 5, wherein the performing further comprises performing the transaction when the authentication information is received from a specified second external device.

7. The method of claim 5, wherein the searching comprises searching for a plurality of second external devices, and wherein the performing further comprises combining pieces of authentication information received from the plurality of second external devices, and performing the transaction by using the combined pieces of the authentication information.

8. The method of claim 5, wherein the searching comprises searching for a plurality of second external devices, wherein pieces of different authentication information are respectively stored in the second external devices, and wherein the performing further comprises performing the transaction by using at least one of the pieces of the different authentication information that are received from the second external devices.

9. The method of claim 5, wherein the searching comprises searching for a plurality of second external devices, wherein pieces of same authentication information are respectively stored in the second external devices, and wherein the performing further comprises performing the transaction by using at least one of the pieces of the same authentication information that are received from the second external devices.

10. The method of claim 1, further comprising:

when the transaction information is received, requesting the first external device for a video call;

receiving an image of a user of the first external device from the first external device via the video call, wherein the image was captured by the first external device; and determining whether to perform the transaction based on the image.

11. The method of claim 1, further comprising:

displaying the transaction request on a screen of the device.

12. The method of claim 1, wherein the transaction information comprises at least one of product information, transaction amount information, and the transaction request that are related to a product that a user of the first external device attempts to purchase.

13. The method of claim 12, wherein the product information is provided to the first external device from a website that the first external device accesses to purchase the product.

14. The method of claim 12, wherein the product information is obtained by the first external device based on an image of a barcode of the product, and wherein the image was captured by the first external device.

15. A method of securing a network transaction via a first external device, the method performed by a device, and the method comprising:

determining, by a computer processor of the device, a position of the device using at least one of global position system (GPS) sensor information and access point (AP) information;

searching, by the computer processor of the device for the first external device in which a transaction application is installed;

requesting, by the computer processor of the device, the first external device for the transaction; and receiving, via a first network interface of the device, transaction completion information that is generated when the first external device performs the transaction, wherein the requesting comprises providing transaction information including a transaction request requesting the transaction to the first external device, and wherein the transaction information and authentication information that is received by the first external device through near field communication or Bluetooth communication via a second network interface from a second external device near the first external device are used by the first external device to authenticate the transaction and perform the transaction.

16. A method of securing a network transaction, the method performed by a device on behalf of a first external device, and the method comprising:

obtaining, via a first network interface of the device, transaction information for the transaction, the transaction information including a transaction request requesting the transaction;

determining, by a computer processor of the device, a position of the device using at least one of global position system (GPS) sensor information and access point (AP) information;

searching, by the computer processor of the device, for at least one second external device near the device based on the position of the device;

receiving, via a second network interface of the device, authentication information from the searched for at least one second external device through near field communication or Bluetooth communication;

authenticating the transaction, via an application stored in memory of the device, using the authentication information; and performing, using the computer processor of the device, the transaction with a transaction server by using the authentication information and the transaction information received from the at least one second external device and the transaction information.

17. A device configured to secure a network transaction comprising:

a memory configured store at least one program; and a processor configured to perform a transaction on behalf of a first external device by executing the at least one program, wherein the at least one program comprises commands for executing:

receiving, via a first network interface of the device, transaction information including a transaction request requesting the transaction, the transaction information being received from the first external device;

determining a position of the device using at least one of global position system (GPS) sensor information and access point (AP) information;

searching for a second external device, based on the position of the device and the transaction information;

receiving, via a second network interface of the device, authentication information from the searched for second external device through near field communication or Bluetooth communication;

authenticating the transaction using the authentication information; and performing the transaction with a transaction server by using the transaction information and the authentication information received from the second external device.

18. A non-transitory computer-readable recording medium having a program recorded thereon, the program causing a computer to execute a method for securing a network transaction comprising:

receiving, via a first network interface of the device, transaction information including a transaction request requesting the transaction, the transaction information being received from the first external device;

determining, by a computer processor of the device, a position of the device using at least one of global position system (GPS) sensor information and access point (AP) information;

searching for a second external device based on the position of the device and the transaction information;

receiving, via a second network interface of the device, authentication information from the searched for second external device through near field communication or Bluetooth communication;

authenticating the transaction, via an application stored in memory of the device, using the authentication information; and performing the transaction with a transaction server by using the transaction information and the authentication information received from the second external device.

19. A non-transitory computer-readable recording medium having a program recorded thereon, the program causing a computer to execute a method for securing a network transaction comprising:

determining, by a computer processor of the device, a position of the device using at least one of global position system (GPS) sensor information and access point (AP) information;

searching, by the computer processor of the device, for a first external device in which a transaction application is installed;

requesting the first external device for the transaction; and receiving, via a first network interface of the device, transaction completion information that is generated when the first external device performs the transaction, wherein the requesting comprises providing transaction information including a transaction request requesting the transaction to the first external device, and wherein the transaction information and authentication information that is received by the first external device through near field communication or Bluetooth communication via a second network interface from a second external device near the first external device are used by the first external device to authenticate the transaction and perform the transaction.

20. A non-transitory computer-readable recording medium having a program recorded thereon, the program causing a device to execute a method for securing a network transaction comprising:

obtaining transaction information for the transaction via a first network interface, the transaction information including a transaction request requesting the transaction;

determining, by a computer processor of the device, a position of the device using at least one of global position system (GPS) sensor information and access point (AP) information;

searching, by the computer processor of the device, for at least one second external device near the device based on the position of the device;

receiving, via a second network interface of the device, authentication information from the searched for at least one second external device through near field communication or Bluetooth communication;

authenticating the transaction using the authentication information; and performing the transaction with a transaction server by using the transaction information and the authentication information received from the at least one second external device.

* * * * *